United States Patent
Tsunekawa et al.

(10) Patent No.: US 8,687,537 B2
(45) Date of Patent: Apr. 1, 2014

(54) COMMUNICATION SYSTEM, RECEPTION DEVICE, AND COMMUNICATION METHOD

(75) Inventors: Koichi Tsunekawa, Osaka (JP); Katsutoshi Ishikura, Osaka (JP); Toshiaki Kameno, Osaka (JP); Yoshio Konno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 13/000,297

(22) PCT Filed: Jul. 8, 2009

(86) PCT No.: PCT/JP2009/062473
§ 371 (c)(1),
(2), (4) Date: Dec. 20, 2010

(87) PCT Pub. No.: WO2010/005036
PCT Pub. Date: Jan. 14, 2010

(65) Prior Publication Data
US 2011/0116438 A1 May 19, 2011

(30) Foreign Application Priority Data
Jul. 8, 2008 (JP) .............................. P2008-177946

(51) Int. Cl.
H04H 20/71 (2008.01)
H04K 1/10 (2006.01)
(52) U.S. Cl.
USPC .......................................... 370/312; 375/260
(58) Field of Classification Search
USPC ................................................ 370/312, 339
See application file for complete search history.

(56) References Cited

U.S. PATENT DOCUMENTS

| 2006/0182192 A1 | 8/2006 | Takano |
| 2007/0280115 A1* | 12/2007 | Meyer et al. .................. 370/236 |
| 2009/0010196 A1* | 1/2009 | Bui et al. ........................ 370/312 |
| 2009/0074086 A1 | 3/2009 | Murakami et al. |

FOREIGN PATENT DOCUMENTS

| EP | 1 892 865 A1 | 2/2008 |
| EP | 1 983 670 A1 | 10/2008 |
| EP | 2 015 487 A1 | 1/2009 |
| EP | 2 015 488 A1 | 1/2009 |
| EP | 2 051 408 A1 | 4/2009 |

(Continued)

OTHER PUBLICATIONS

3GPP TS 36.300 V8.2.0 (Sep. 2007); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 8).

Primary Examiner — Afshawn Towfighi
(74) Attorney, Agent, or Firm — Birch, Stewart, Kolasch & Birch, LLP

(57) ABSTRACT

A communication system includes a reception device and at least one transmission device. The transmission device includes: a signal transmission unit which transmits at least one unicast signals and a multicast signal to the reception device. The reception device includes: a plurality of signal reception units which receive at least one the unicast signals and the multicast signal from the transmission device; a first control unit which receives the unicast signals from the transmission device using all of the plurality of signal reception units when only the unicast signals are received; and a second control unit which receives the unicast signals from the transmission device using some of the plurality of signal reception units, and simultaneously receives the multicast signal from the transmission device using another signal reception unit of the plurality of signal reception units, when the unicast signals and the multicast signal are received.

12 Claims, 14 Drawing Sheets

(56) References Cited

FOREIGN PATENT DOCUMENTS

| | | |
|---|---|---|
| JP | 2005-277787 A | 10/2005 |
| JP | 2006-203685 A | 8/2006 |
| JP | 2007-89144 A | 4/2007 |
| JP | 2007-194867 A | 8/2007 |
| JP | 2007-221743 A | 8/2007 |
| JP | 2007-300503 A | 11/2007 |
| JP | 2007-300507 A | 11/2007 |
| WO | WO 2008/018130 A1 | 2/2008 |
| WO | WO 2008/043078 A2 | 4/2008 |

* cited by examiner

COMMUNICATION SYSTEM, RECEPTION DEVICE, AND COMMUNICATION METHOD

TECHNICAL FIELD

The present invention relates to a communication system, a reception device, and a communication method.

This application claims priority to and the benefits of Japanese Patent Application No. 2008-177946 filed on Jul. 8, 2008, the disclosure of which is incorporated herein by reference.

BACKGROUND ART

In an evolved-universal terrestrial radio access network (E-UTRAN), a service known as multimedia broadcast/multicast service (MBMS) has been studied.

The MBMS is a broadcast/multicast service using a mobile packet network. In a previous video content distribution service, content is transmitted in a circuit switching (CS) area, a point-to-point connection is established between a server and each user who receives the service, and the content is provided by streaming.

However, in the case in which a multimedia service is simultaneously provided to a number of users, a multicast service is necessary. A service in which a multicast connection is established in a packet switching (PS) area is the MBMS, and the use of a point-to-multipoint type radio channel has been studied.

In the MBMS, the use of any one or both of a unicast/MBMS mixed cell and an MBMS dedicated cell has been studied.

The unicast/MBMS mixed cell uses a frequency band to be used along with a service other than the MBMS. The MBMS dedicated cell uses an MBMS dedicated frequency band.

In any case, implementation by a single frequency network (SFN) is possible in MBMS transmission. This is called an MBMB SFN (multimedia broadcast single frequency network (MBSFN)).

In the case of the unicast/MBMS mixed cell, an MBMS subframe (multicast CH (MCH) subframe) and a unicast subframe is subjected to time division multiplexing (TDM), so that MBMS transmission is performed, as shown in Patent Document 1.

In this case, a radio reception device transmits a unicast frame and an MBMS frame by TDM as disclosed in Patent Document 1. Thus, a unicast channel, a unique pilot channel, and the like are derived in a unicast frame period. Also, an MBMS channel and a common pilot channel (and a unique pilot channel) are derived in an MBMS frame period. MBMS and unicast data are received by demodulating each data.

On the other hand, the MBMS dedicated cell has also been studied as disclosed in Non-Patent Document 1. In the MBMS service, no unicast data is transmitted and there is no operation which responds to an uplink signal.

During MBMS reception in the MBMS dedicated cell, the radio reception device can not perform unicast communication. Thus, a unicast signal reception method performs communication by a system, not by E-UTRA.

Even when an E-UTRA service is provided in the same area, a prescription for simultaneously using the MBMS and the unicast service does not exist. Thus, it is necessary to provide a unicast communication system, separated from a reception system for receiving the MBMS, as in other systems.

Patent Document 2 discloses a method of transmitting the unicast service and the MBMS by frequency division multiplexing (FDM).

If some subcarriers are exclusively used for the MBMS, the same process as that of a receiver disclosed in Patent Document 1 is performed. That is, if the MBMS is serviced, MBMS data is received. If the unicast service is received, unicast data is received.

However, it is necessary to provide a dedicated radio reception device for multicast communication in an area where a multicast communication service such as the MBMS is provided in the related art. Thus, there is a problem in that multicast communication and unicast communication can not be simultaneously performed between a radio transmission device and a radio reception device.

Patent Document 1: Japanese Unexamined Patent Application, First Publication No. 2007-300503

Patent Document 2: Japanese Unexamined Patent Application, First Publication No. 2007-194867

Non-Patent Document 1: 3 GPP TS 36.300 V8.2.0 (2007-09); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)

DISCLOSURE OF INVENTION

Problem to be Solved by the Invention

The present invention has been made in view of the above-described circumstances, and an object of the invention is to provide a communication system, a reception device, and a communication method capable of simultaneously performing multicast communication and unicast communication even when a dedicated reception device for the multicast communication is not provided.

Means for Solving the Problem (1) The present invention has been made to solve the above-described problems. According to an aspect of the present invention, there is provided a communication system including a reception device and at least one transmission device, wherein the transmission device includes: a signal transmission unit which transmits at least one unicast signals and a multicast signal to the reception device, and the reception device includes: a plurality of signal reception units which receive at least one the unicast signals and the multicast signal from the transmission device; a first control unit which receives the unicast signals from the transmission device using all of the plurality of signal reception units when only the unicast signals are received; and a second control unit which receives the unicast signals from the transmission device using some of the plurality of signal reception units, and simultaneously receives the multicast signal from the transmission device using another signal reception unit of the plurality of signal reception units, when the unicast signals and the multicast signal are received.

(2) In the communication system according to the aspect of the present invention, the reception device may include an offset estimation unit which performs offset estimation using reference signals included in the unicast signals when the unicast signals and the multicast signal are received, and which performs offset estimation using a reference signal included in the multicast signal when only the multicast signal is received.

(3) In the communication system according to the aspect of the present invention, the second control unit may switch a signal reception unit which receives the unicast signals and a signal reception unit which receives the multicast signal when reception quality of the signal reception unit which receives the unicast signals is higher than reception quality of the signal reception unit which receives the multicast signal.

(4) In the communication system according to the aspect of the present invention, the reception device may notify the transmission device of terminal capacity of its own reception device.

(5) In the communication system according to the aspect of the present invention, the reception device may notify the transmission device of a terminal capacity change when terminal capacity of its own reception device is changed, and the transmission device may change unicast signal transmission and multicast signal transmission when the terminal capacity change is notified from the reception device.

(6) In the communication system according to the aspect of the present invention, the transmission device may notify the reception device of the change of the unicast signal transmission and of the multicast signal transmission.

(7) In the communication system according to the aspect of the present invention, the transmission device may notify the reception device of change permission information for permitting the change and timing information indicating a change timing when the reception device is notified of the change of the unicast signal transmission and of the multicast signal transmission.

(8) According to another aspect of the present invention, there is provided a reception device which communicates with at least one transmission device, the reception device including: a plurality of signal reception units which receive at least one unicast signals and a multicast signal from the transmission device; a first control unit which receives the unicast signals from the transmission device using all of the plurality of signal reception units when only the unicast signals are received; and a second control unit which receives the unicast signals from the transmission device using some of the plurality of signal reception units, and simultaneously receives the multicast signal from the transmission device using another signal reception unit of the plurality of signal reception units, when the unicast signals and the multicast signal are received.

(9) According to further another aspect of the present invention, there is provided a communication method using at least one transmission device and a reception device having a plurality of signal reception units which receive at least one unicast signals and a multicast signal from the transmission device, the communication method including: transmitting, by the transmission device, at least one the unicast signals and the multicast signal to the reception device; receiving, by the reception device, the unicast signals from the transmission device using all of the plurality of signal reception units when only the unicast signals are received; and receiving, by the reception device, the unicast signals from the transmission device using some of the plurality of signal reception units, and simultaneously receiving the multicast signal from the transmission device using another signal reception unit of the plurality of signal reception units, when the unicast signals and the multicast signal are received.

Effect of the Invention

In a communication system, a reception device, and a communication method of the present invention, multicast communication and unicast communication can be simultaneously performed even when a dedicated reception device for the multicast communication is not provided.

BEST MODE FOR CARRYING OUT THE INVENTION

Embodiments of the present invention will now be described with reference to the drawings. First, a first embodiment of the present invention will be described.

First Embodiment

Figure 1:
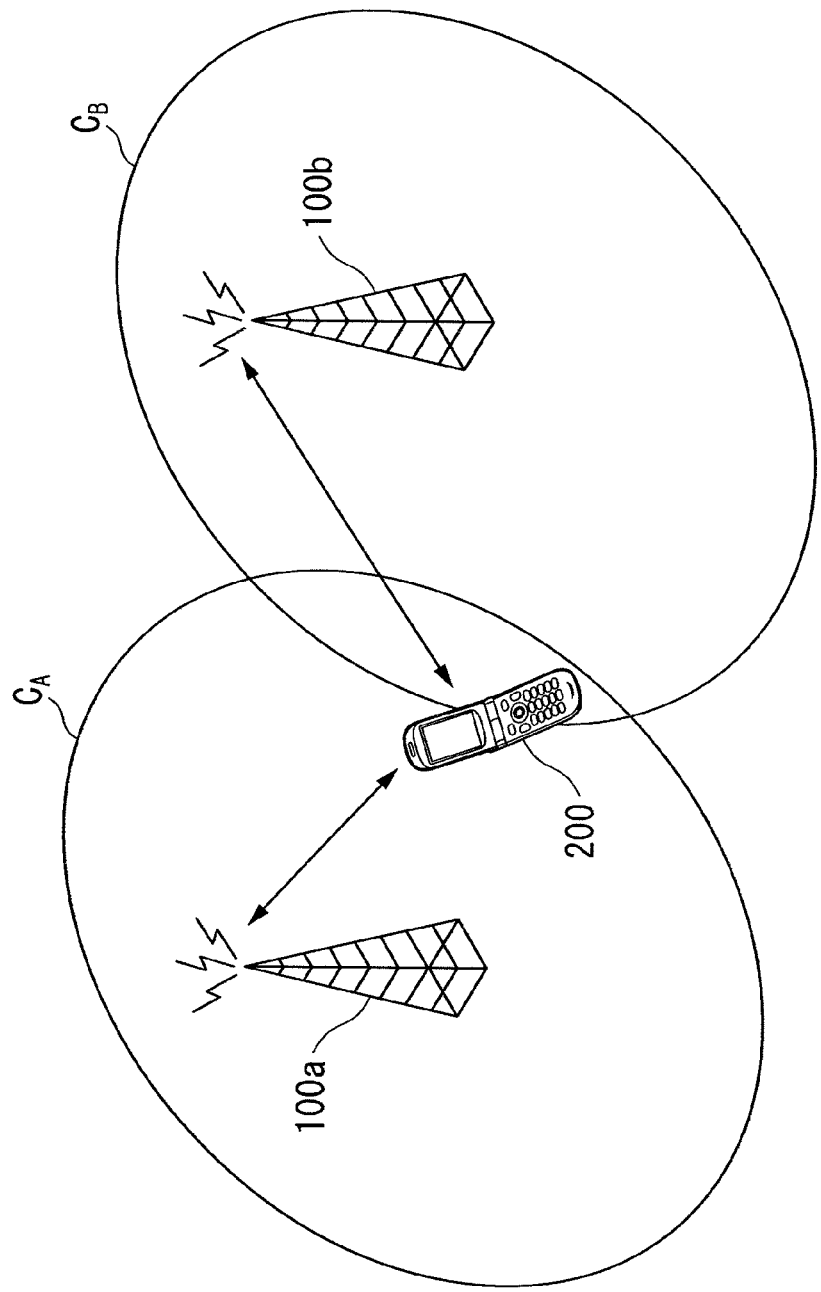
FIG. 1 is a conceptual configuration diagram of a wireless communication system according to a first embodiment of the present invention.

FIG. 1 is a conceptual configuration diagram of a wireless communication system (also referred to as a communication system) according to a first embodiment of the present invention. The wireless communication system uses an orthogonal frequency division multiplexing (OFDM) technique. FIG. 1 shows the case where a base station 100a and a base station 100b communicate with a terminal 200 which is a mobile phone.

The base station 100a and the base station 100b perform provide a unicast communication service for performing different communication for each terminal, such as voice communication, TV telephone communication, or packet communication, at a frequency f1. Also, the base station 100a and the base station 100b provide an MBMS communication service that can be commonly used by all terminals, such as voice communication and video communication, at a frequency f2.

A unicast service is provided as an independent service for each base station. In an MBMS, a service of the same content is provided in a fixed area (MBSFN area). The base station 100a and the base station 100b provide the same MBMS service.

An area $C_A$ indicates a range in which the base station 100a is communicable with the terminal 200. An area $C_B$ indicates a range in which the base station 100b can communicate with the terminal 200.

If the unicast communication is performed, the terminal 200 is generally connected to one base station of the base station 100a and the base station 100b, so that desired communication is performed. If the MBMS service is received, the terminal 200 simultaneously receives signals of the base station 100a and the base station 100b and receives the MBMS service by demodulating a combined signal thereof.

In this embodiment, a terminal capable of simultaneously receiving a unicast service and an MBMS service in an environment where these services are provided will be described.

Figure 2:
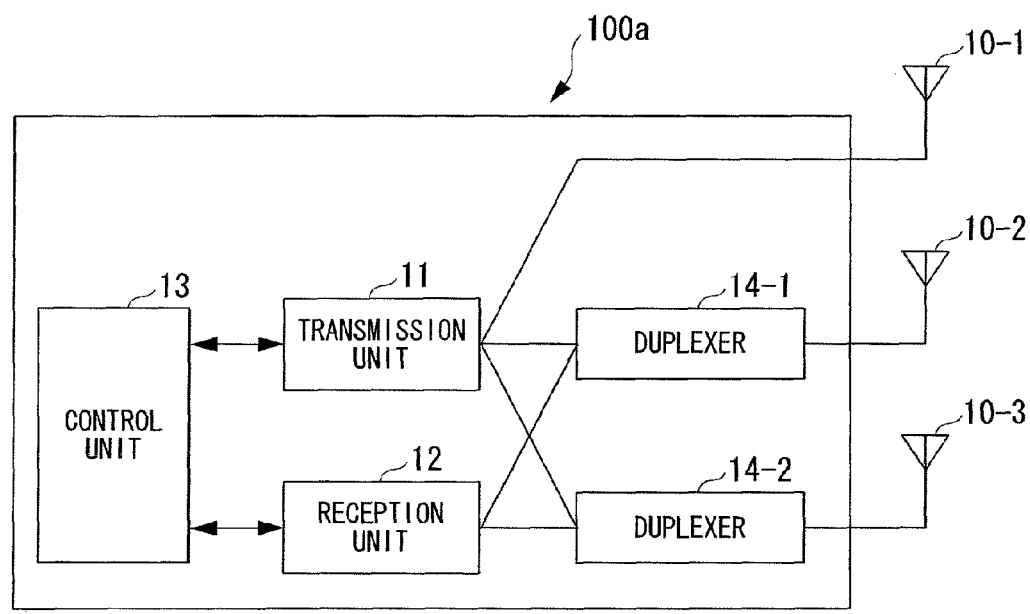
FIG. 2 is a schematic block diagram showing the configuration of a base station according to the first embodiment of the present invention.

FIG. 2 is a schematic block diagram showing the configuration of the base station 100a according to the first embodiment of the present invention. Since the configuration of the base station 100b in FIG. 1 is the same as that of the base station 100a, descriptions thereof will be omitted.

The base station 100a includes antenna units 10-1, 10-2, and 10-3, a transmission unit 11, a reception unit 12, a control unit 13, and duplexers 14-1 and 14-2.

The antenna units 10-1, 10-2, and 10-3 transmit/receive an OFDM signal of a radio frequency band to/from the terminal 200. The antenna unit 10-1 transmits an MBMS signal output from the transmission unit 11 to the terminal 200.

The antenna unit 10-2 transmits a unicast signal output from the duplexer 14-1 to the terminal 200. The antenna unit 10-2 outputs a unicast signal received from the terminal 200 to the duplexer 14-1.

The antenna unit 10-3 transmits a unicast signal output from the duplexer 14-2 to the terminal 200. The antenna unit 10-3 outputs a unicast signal received from the terminal 200 to the duplexer 14-2.

The transmission unit 11 performs a transmission process (a modulation process, an up-conversion process, and the like) for a transmission signal to be transmitted from the base station 100a to the terminal 200 among signals output from the control unit 13, and outputs the signal to the antenna 10-1 and the duplexers 14-1 and 14-2.

The reception unit 12 performs a reception process (a demodulation process, a down-conversion process, and the like) for a reception signal transmitted from the terminal 200 to the base station 100a among signals output from the duplexers 14-1 and 14-2, and outputs the signal to the control unit 13.

The control unit 13 outputs a signal to be transmitted from the base station 100a to the terminal 200 to the transmission unit 11. Also, the control unit 13 receives a signal transmitted from the terminal 200 to the base station 100a from the reception unit 12. The control unit 13 controls each part of the base station 100a.

The duplexers 14-1 and 14-2 are devices for sharing transmission/reception signals using one antenna.

The duplexer 14-1 outputs a transmission signal output from the transmission unit 11 to the antenna unit 10-2. Also, the duplexer 14-1 outputs a reception signal output from the antenna unit 10-2 to the reception unit 12.

The duplexer 14-2 outputs a transmission signal output from the transmission unit 11 to the antenna unit 10-3. Also, the duplexer 14-2 outputs a reception signal output from the antenna unit 10-3 to the reception unit 12.

Figure 3:
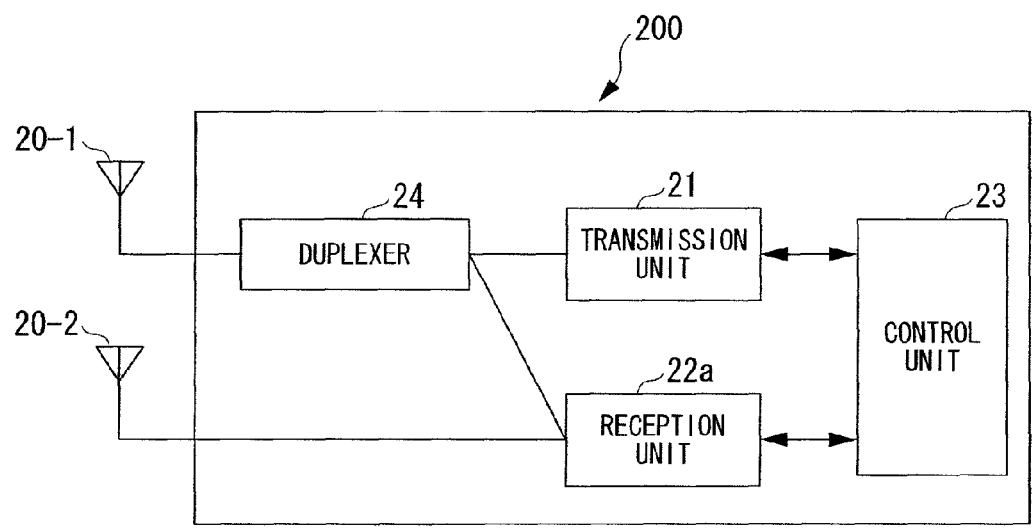
FIG. 3 is a schematic block diagram showing the configuration of a terminal according to the first embodiment of the present invention.

FIG. 3 is a schematic block diagram showing the configuration of the terminal 200 according to the first embodiment of the present invention. The terminal 200 includes antenna units 20-1 and 20-2, a transmission unit 21, a reception unit 22a, a control unit 23, and a duplexer 24.

The antenna units 20-1 and 20-2 transmit/receive an OFDM signal of a radio frequency band to/from the base stations 200a and 200b. The antenna unit 20-1 transmits/receives unicast signals to/from the base stations 200a and 200b. Also, the antenna unit 20-2 receives MBMS signals or unicast signals from the base stations 100a and 100b.

The transmission unit 21 performs a transmission process (a modulation process, an up-conversion process, and the like) for a transmission signal to be transmitted from the terminal 200 to the base stations 100a and 100b among signals output from the control unit 23, and outputs the signal to the duplexer 24.

The reception unit 22a performs a reception process (a demodulation process, a down-conversion process, and the like) for reception signals transmitted from the base stations 100a and 100b to the terminal 200 among signals output from the duplexer 24 or the antenna unit 20-2, and outputs the signals to the control unit 23.

The control unit 23 outputs a signal to be transmitted from the terminal 200 to the base stations 100a and 100b to the transmission unit 21. Also, the control unit 23 receives signals transmitted from the base stations 100a and 100b to the terminal 200 from the reception unit 22a. Also, the control unit 23 controls each part of the terminal 200.

The duplexer 24 is a device for sharing transmission/reception signals by one antenna unit. The duplexer 24 outputs a transmission signal output from the transmission unit 21 to the antenna unit 20-1. Also, the duplexer 24 outputs a reception signal output from the antenna unit 20-1 to the reception unit 22a.

In this embodiment, unicast data communication is performed by 2×2 multiple input multiple output (MIMO) communication.

The terminal 200 in FIG. 3 transmits a transmission signal using only one antenna, but one duplexer is added so that the antenna unit 20-2 can perform transmission if transmission, like transmit diversity, is performed using two antennas.

Figure 4:
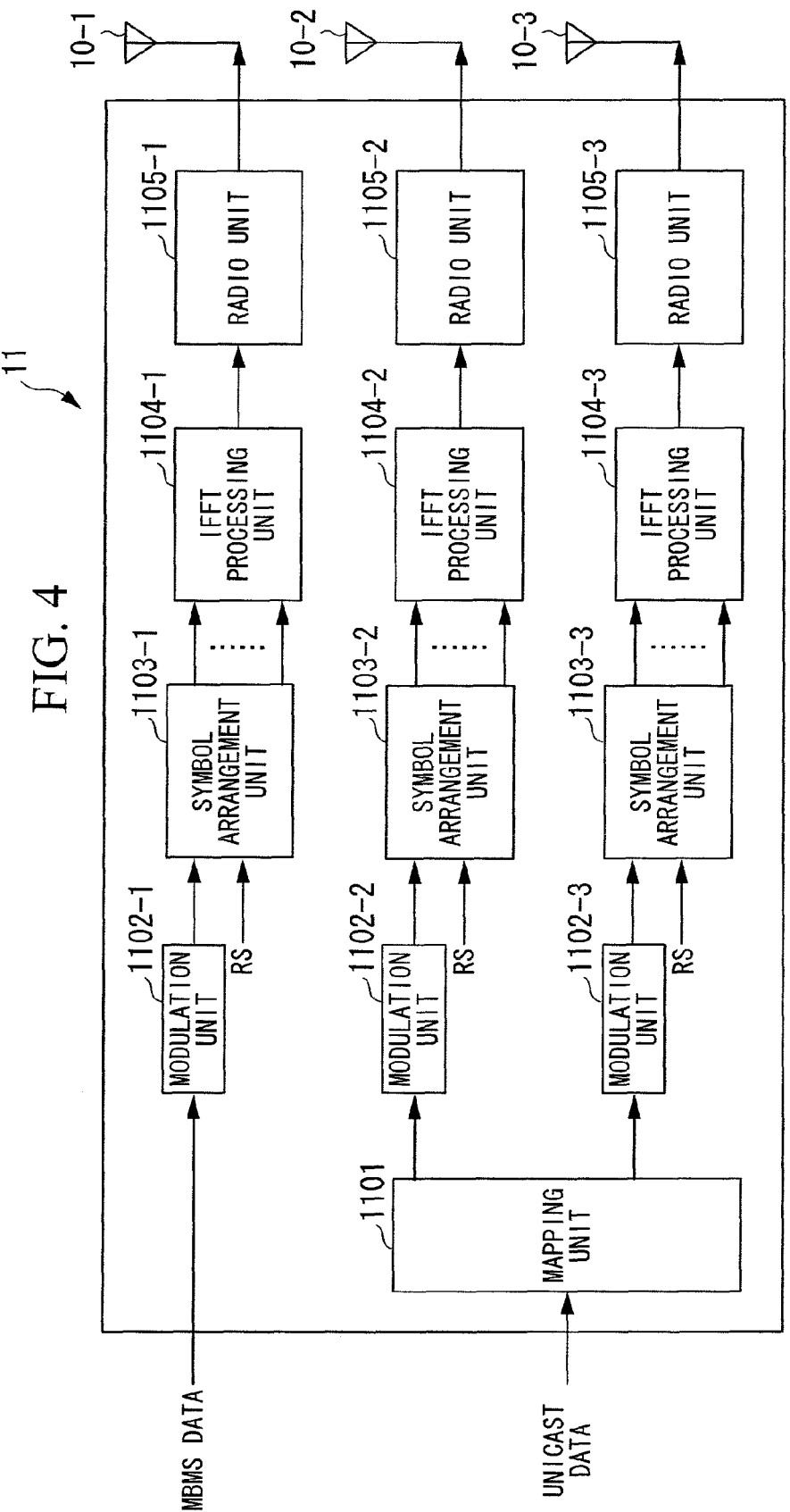
FIG. 4 is a schematic block diagram showing the configuration of a transmission unit of the base station according to the first embodiment of the present invention.

FIG. 4 is a schematic block diagram showing the configuration of the transmission unit 11 (FIG. 2) of the base station 100 according to the first embodiment of the present invention. The transmission unit 11 includes a mapping unit 1101, modulation units 1102-1 to 1102-3, symbol arrangement units 1103-1 to 1103-3, IFFT (inverse fast Fourier transform) processing units 1104-1 to 1104-3, and radio units 1105-1 to 1105-3.

An MBMS transmission signal (MBMS data) and a unicast transmission signal (unicast data) are separately generated. The MBMS data is transmitted from the antenna unit 10-1. The unicast data is transmitted from the antenna units 10-2 and 10-3. The MBMS data and the unicast data use different frequency bands. For example, the MBMS data is transmitted to the terminal 200 using a band of a center frequency f1, and the unicast data is transmitted to the terminal 200 using a band of a center frequency f2.

The unicast communication corresponds to 2×2 MIMO communication and communication with the terminal 200 is performed using the antenna units 10-2 and 10-3.

First, the case where the MBMS communication is performed will be described. Data such as MBMS data corresponding to MBMS information common for all users or control data corresponding to a control signal is input from the control unit 13 (FIG. 2) to the modulation unit 1102-1.

The modulation unit 1102-1 performs modulation corresponding to each data and obtains a modulated data symbol. For example, in the case in which a communication environment of a service area where the base station 100a can communicate is good, MBMS data is modulated by 64 quadrature amplitude modulation (64QAM) and control data is modulated by quadrature phase shift keying (QPSK) or the like, so that data symbols can be obtained.

The data symbols modulated by the modulation unit 1102-1 are input to the symbol arrangement unit 1103-1. A reference signal (RS) is also input to the symbol arrangement unit 1103-1.

The symbol arrangement unit 1103-1 arranges the data symbols generated by the modulation unit 1102-1 and the RS in resource elements so that a predetermined symbol arrangement is made.

The IFFT processing unit 1104-1 converts each arranged symbol from a frequency domain signal into a time domain signal.

Thereafter, the radio unit 1105-1 performs conversion into a signal of a radio frequency band. The signal is transmitted from the antenna unit 10-1 (FIG. 2) to the terminal 200.

Next, the case where the unicast communication is performed will be described. Data such as unicast data corresponding to information for allowing the base station 100a to individually communicate with each user or control data corresponding to a control signal for the unicast communication is input from the control unit 13 (FIG. 2) to the mapping unit 1101.

The data input to the mapping unit 1101 is separated into data to be transmitted to the antenna units 10-2 and 10-3 for performing MIMO communication, and is input to the modulation units 1102-2 and 1102-3 corresponding to the antenna units 10-2 and 10-3. That is, data to be transmitted from the antenna unit 10-2 is input from the mapping unit 1101 to the modulation unit 1102-2. Data to be transmitted from the antenna unit 10-3 is input from the mapping unit 1101 to the modulation unit 1102-3.

The modulation unit 1102-2 modulates the unicast data or the control data output from the mapping unit 1101 and obtains a modulated data symbol. For example, in the case in which a communication environment of a user who performs communication is good, user data is modulated by 64QAM and control data is modulated by QPSK or the like, so that data symbols can be obtained. The data symbols modulated by the modulation unit 1102-2 are input to the symbol arrangement unit 1103-2.

An RS is also input to the symbol arrangement unit 1103-2. The symbol arrangement unit 1103-2 arranges the data symbols generated by the modulation unit 1102-2 and the RS in resource elements so that a predetermined symbol arrangement is made.

The IFFT processing unit 1104-2 converts each symbol arranged by the symbol arrangement unit 1103-2 from a frequency domain signal into a time domain signal.

Thereafter, the radio unit 1105-2 performs conversion into a signal of a radio frequency band. The signal is transmitted from the antenna unit 10-2 (FIG. 2) to the terminal 200.

The modulation unit 1102-3 modulates the unicast data or the control data output from the mapping unit 1101 and obtains a modulated data symbol. For example, in the case in which a communication environment of a user who performs communication is good, user data is modulated by 64QAM and control data is modulated by QPSK or the like, so that data symbols can be obtained. The data symbols modulated by the modulation unit 1102-3 are input to the symbol arrangement unit 1103-3.

An RS is also input to the symbol arrangement unit 1103-3. The symbol arrangement unit 1103-3 arranges the data symbols generated by the modulation unit 1102-3 and the RS in resource elements so that a predetermined symbol arrangement is made.

The IFFT processing unit 1104-3 converts each symbol arranged by the symbol arrangement unit 1103-3 from a frequency domain signal into a time domain signal.

Thereafter, the radio unit 1105-3 performs conversion into a signal of a radio frequency band. The signal is transmitted from the antenna unit 10-3 (FIG. 2) to the terminal 200.

A terminal corresponding to 2×2 MIMO and a terminal which does not correspond to 2×2 MIMO exist among terminals which communicate with the base station. Thus, the base station checks the capacity of each user by terminal capacities received from the terminals. 2×2 MIMO data is arranged for the terminal corresponding to the 2×2 MIMO. Data for a single antenna is arranged for a terminal of the single antenna.

Figure 5:
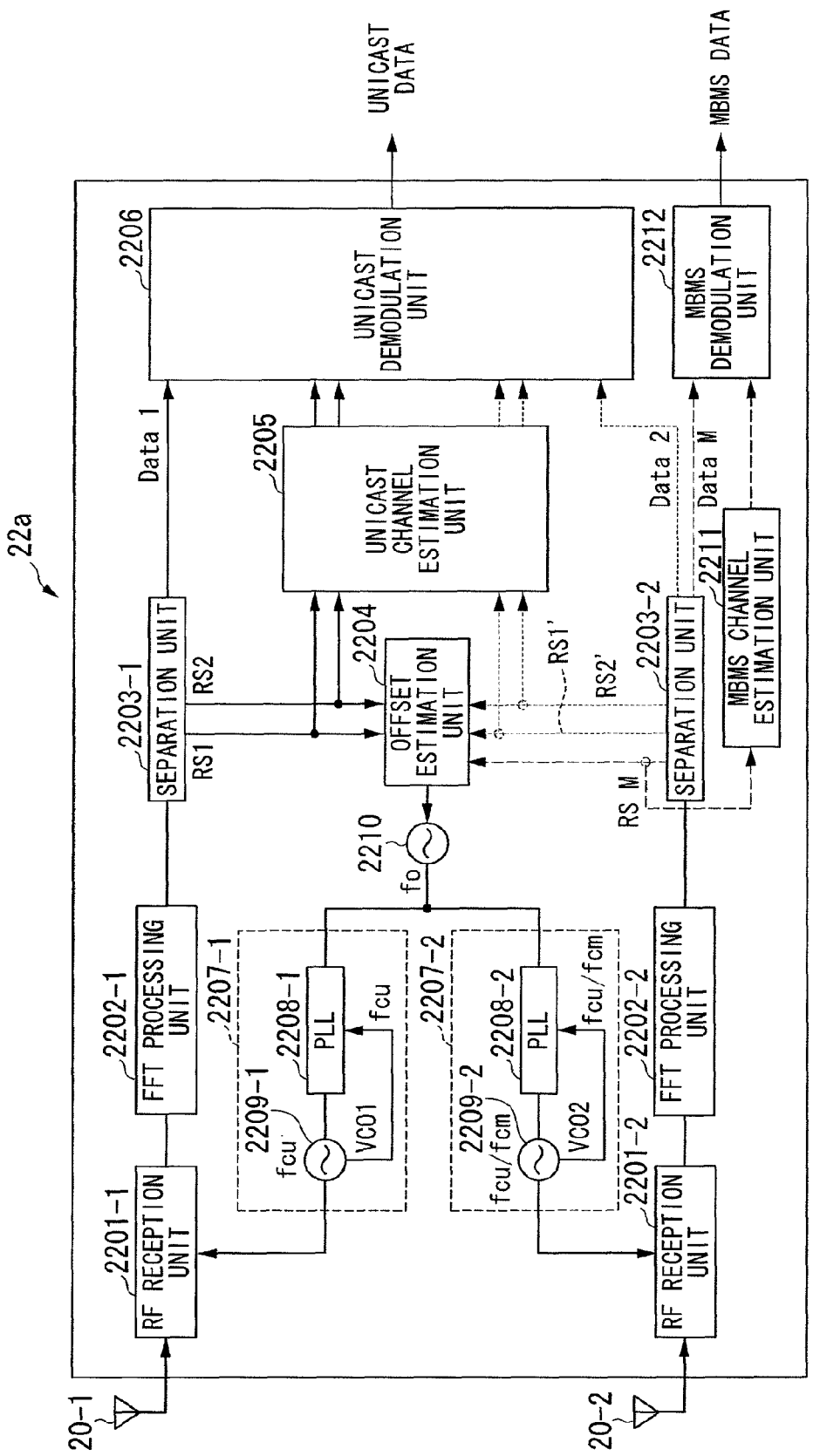
FIG. 5 is a schematic block diagram showing the configuration of a reception unit of the terminal according to the first embodiment of the present invention.

FIG. 5 is a schematic block diagram showing the configuration of the reception unit 22a (FIG. 3) of the terminal 200 according to the first embodiment of the present invention. The reception unit 22a includes RF (radio frequency) reception units 2201-1 and 2201-2, FFT (fast Fourier transform) processing units 2202-1 and 2202-2, separation units 2203-1 and 2203-2, an offset estimation unit 2204, a unicast channel estimation unit 2205, a unicast demodulation unit 2206, synthesizer units 2207-1 and 2207-2, a temperature-compensated crystal oscillator 2210, an MBMS channel estimation unit 2211, and an MBMS demodulation unit 2212.

The RF reception unit 2201-1 demodulates a radio signal received by the antenna unit 20-1 (FIG. 3) and outputs the demodulated signal to the FFT processing unit 2202-1.

The FFT processing unit 2202-1 converts a time domain signal demodulated by the RF reception unit 2201-1 into a frequency domain signal, and outputs the frequency domain signal to the separation unit 2203-1.

The separation unit 2203-1 separates the signal, converted by the FFT processing unit 2202-1 from the time domain signal into the frequency domain signal, into an RS and data. The separation unit 2203-1 outputs the RS to the offset estimation unit 2204 and the unicast channel estimation unit 2205, and outputs the data to the unicast demodulation unit 2206.

The RF reception unit 2201-2 demodulates a radio signal received by the antenna unit 20-2 (FIG. 3) and outputs the demodulated signal to the FFT processing unit 2202-2.

The FFT processing unit 2202-2 converts a time domain signal demodulated by the RF reception unit 2201-2 into a frequency domain signal, and outputs the frequency domain signal to the separation unit 2203-2.

The separation unit 2203-2 separates the signal, converted by the FFT processing unit 2202-2 from the time domain signal into the frequency domain signal, into an RS and data.

In the case in which the separated data is unicast data, the separation unit 2203-2 outputs the RS to the offset estimation unit 2204 and the unicast channel estimation unit 2205, and outputs the unicast data to the unicast demodulation unit 2206.

In the case in which the separated data is MBMS data, the separation unit 2203-2 outputs the RS to the offset estimation unit 2204 and the MBMS channel estimation unit 2211, and outputs the MBMS data to the MBMS demodulation unit 2212.

The offset estimation unit 2204 estimates a frequency offset error between the base station and the terminal based on the RSs separated by the separation unit 2203-1 and 2203-2. The offset estimation unit 2204 outputs a voltage control signal calculated based on the estimation result to the temperature-compensated crystal oscillator 2210.

The temperature-compensated crystal oscillator 2210 generates a reference signal f0 to receive a signal from the base station based on the output from the offset estimation unit 2204.

The synthesizer unit 2207-1 generates a local frequency signal fcu for performing demodulation by the RF reception unit 2201-1 based on the reference signal f0 output from the temperature-compensated crystal oscillator 2210, and outputs the local frequency signal fcu to the RF reception unit 2201-1.

The synthesizer unit 2207-2 generates a local frequency signal fcu/fcm for performing demodulation by the RF reception unit 2201-2 based on the reference signal f0 output from the temperature-compensated crystal oscillator 2210, and outputs the local frequency signal fcu/fcm to the RF reception unit 2201-2.

The unicast channel estimation unit 2205 performs channel estimation on a unicast signal based on the RSs separated by the separation units 2203-1 and 2203-2, and outputs the channel estimation result to the unicast demodulation unit 2206.

The unicast demodulation unit 2206 demodulates unicast data using the unicast data output from the separation units 2203-1 and 2203-2 and an estimation value output from the unicast channel estimation unit 2205.

The MBMS channel estimation unit 2211 performs channel estimation on an MBMS signal based on the MBMS RS output from the separation unit 2203-2, and outputs the channel estimation result to the MBMS demodulation unit 2212.

The MBMS demodulation unit 2212 demodulates MBMS data based on the MBMS data output from the separation unit 2203-2 and an estimation value generated by the MBMS channel estimation unit 2211.

The synthesizer unit 2207-1 includes a PLL (phase locked loop) 2208-1 and a VCO (voltage controlled oscillator) 2209-1. The PLL 2208-1 feeds back information of a phase difference between the reference frequency f0 output from the temperature-compensated crystal oscillator 2210 and the local frequency fcu output from the VCO 2209-1 to the VCO 2209-1. Thereby, the local frequency of the VCO 2209-1 is synchronized with the reference frequency.

The synthesizer unit 2207-2 has the same configuration as the synthesizer unit 2207-1 and performs the same operation as the synthesizer unit 2207-1. In this regard, the synthesizer unit 2207-2 can perform switching to an MBMS local frequency fcm by switching a frequency setting of a PLL 2208-2.

The case where the MBMS is received by the reception unit 22a is different from the case where only the unicast communication is performed by the reception unit 22a. An arrow indicated by a dotted line in FIG. 5 indicates a signal which flows when a unicast signal is received. An arrow indicated by a dashed line in FIG. 5 indicates a signal which flows when an MBMS signal is received.

Figure 6:
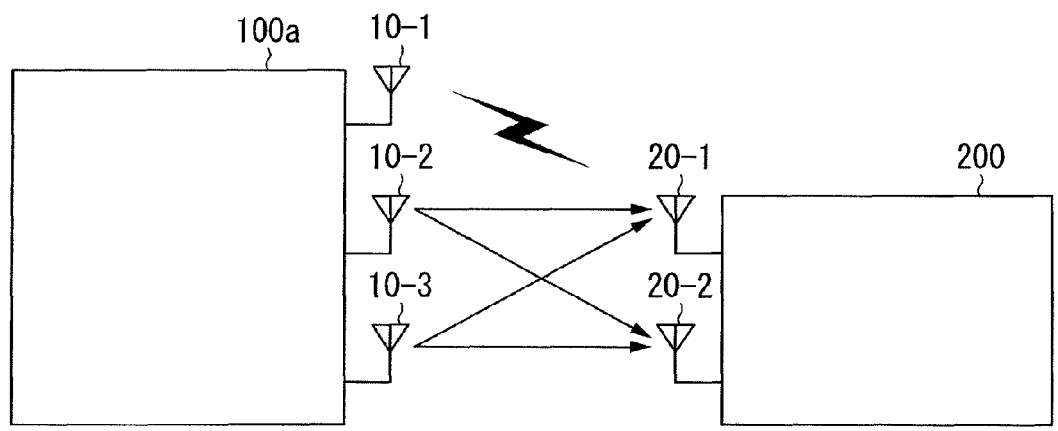
FIG. 6 is a schematic diagram showing the case where the terminal receives unicast signals transmitted from the base station according to the first embodiment of the present invention.

FIG. 6 is a schematic diagram showing the case where the terminal 200 receives unicast signals transmitted from the base station 100a according to the first embodiment of the present invention. An MBMS signal is transmitted from the antenna unit 10-1 of the base station 100a to the terminal 200. The unicast signals are transmitted from the antenna units 10-2 and 10-3 of the base station 100a to the terminal 200.

Common data is transmitted as an MBMS signal from the base station 100a to all terminals located in the area $C_A$ (FIG. 1) where the base station 100a can communicate with terminals. The terminal 200 which performs only unicast signal communication does not receive the MBMS signal. The unicast signals are transmitted from the base station 100a to the terminal 200 as signals corresponding to 2×2 MIMO.

The terminal 200 has the two antenna units 20-1 and 20-2, which both receive the unicast signals. Both the received signals are input to the unicast demodulation unit 2206 (FIG. 5) which demodulates the unicast signals. The unicast demodulation unit 2206 performs demodulation corresponding to the 2×2 MIMO using the received signals input from the antenna units 20-1 and 20-2.

Figure 7:
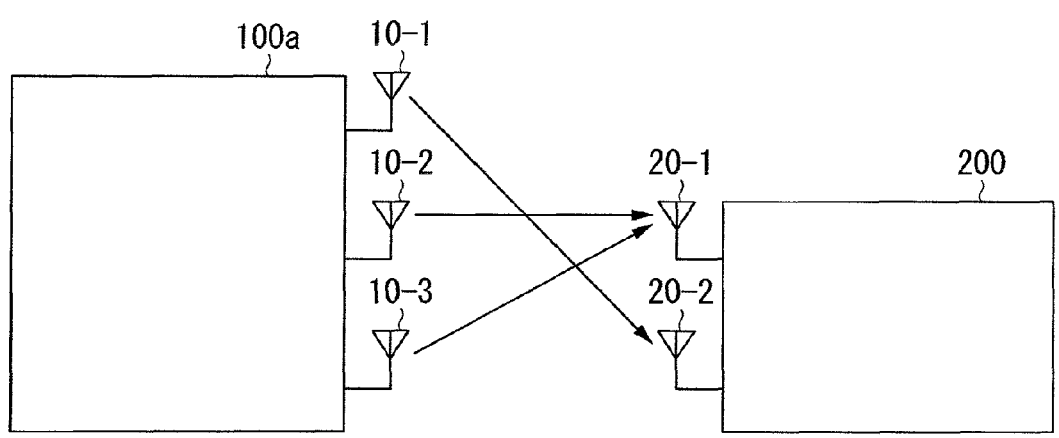
FIG. 7 is a schematic diagram showing the case where the terminal receives unicast signals and an MBMS signal transmitted from the base station according to the first embodiment of the present invention.

FIG. 7 is a schematic diagram showing the case where the terminal 200 receives unicast signals and an MBMS signal transmitted from the base station 100a according to the first embodiment of the present invention. As in FIG. 6, the base station 100a transmits the MBMS signal from the antenna unit 10-1, and transmits unicast signals from the antenna units 10-2 and 10-3. However, in the case in which the terminal 200 receives the MBMS signal, the unicast signals are received only by the antenna unit 20-1 of the terminal 200. Thus, as the unicast signals, the base station 100a transmits signals for one antenna.

The terminal 200 uses the two antenna units 20-1 and 20-2 for MBMS signal reception and unicast signal reception.

The antenna unit 20-1 receives the unicast signals from the base station 100a. The unicast signals received by the antenna unit 20-1 are demodulated by the unicast demodulation unit 2206 (FIG. 5). The unicast demodulation unit 2206 demodulates the unicast signals received by the antenna unit 20-1.

The antenna unit 20-2 receives the MBMS signal from the base station 100a. The MBMS signal received by the antenna unit 20-2 is demodulated by the MBMS demodulation unit 2212 (FIG. 5).

The signal demodulated by the unicast demodulation unit 2206 or the MBMS demodulation unit 2212 is processed according to service content, and image data, audio data, or packet data is extracted.

Descriptions are given with reference to FIG. 5. If the terminal 200 performs only the unicast communication, both of the antenna units 20-1 and 20-2 receive unicast signals and operate as the MIMO of the two receiving antennas. The temperature-compensated crystal oscillator 2210 outputs a signal of the reference frequency f0. Based on the reference signal f0, the control unit 23 (FIG. 3) sets both of the synthesizer units 2207-1 and 2207-2 to the local frequency fcu to receive the unicast signals.

The RF reception units 2201-1 and 2201-2 convert unicast RF signals into baseband signals by the local frequency fcu. If OFDM communication is performed, a cyclic prefix (CP) is generally inserted to remove the effect of a delay wave. Thus, the RF reception units 2201-1 and 2201-2 remove CPs and output the results to the FFT processing units 2202-1 and 2202-2.

The FFT processing units 2202-1 and 2202-2 convert time domain baseband signals into frequency domain signals by an FFT. Unicast communication data converted into the frequency domain is output to the separation units 2203-1 and 2203-2. The separation unit 2203-1 separates the received data into an RS and a data component.

Positions into which RSs are inserted into signals to be transmitted from the antenna units 10-2 and 10-3 of the base station 100*a* are determined in advance between the base station 100*a* and the terminal 200.

Figure 8:
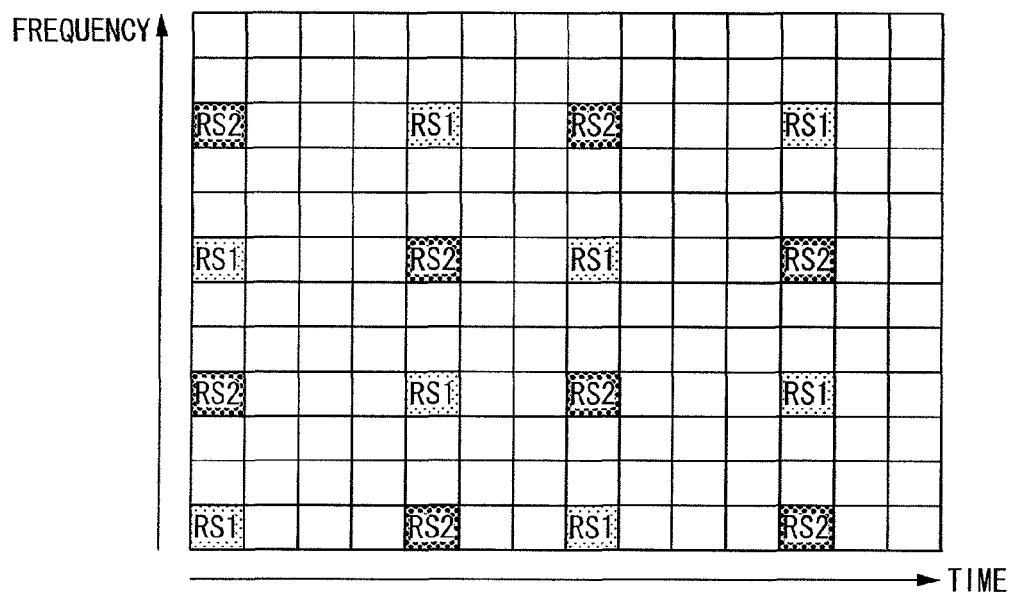
FIG. 8 is a diagram showing an example of unicast signals transmitted from the base station to the terminal according to the first embodiment of the present invention.

FIG. 8 is a diagram showing an example of unicast signals to be transmitted from the base station 100*a* to the terminal 200 according to the first embodiment of the present invention. In FIG. 8, the horizontal axis is a time axis, and the vertical axis is a frequency axis. In FIG. 8, one box represents one resource element. In FIG. 8, 12 subcarriers are arranged in a frequency-axis direction, and one subframe (1 ms) including 14 symbols is arranged in a time-axis direction.

A subcarrier interval is 15 kHz. A guard interval called a CP is provided in each symbol. The CP is determined based on an amount of delay which is determined in a wireless communication system.

In FIG. 8, RS1 is an RS which is transmitted from the antenna unit 10-2 of the base station 100*a*. RS2 is an RS which is transmitted from the antenna unit 10-3.

In the arrangement as shown in FIG. 8, the terminal 200 respectively separates signals transmitted from the base station 100*a* by the separation unit 2003-1. The separation unit 2003-1 outputs the RSs RS1 and RS2 to the offset estimation unit 2204 and the unicast channel estimation unit 2205.

The separation unit 2003-1 outputs data other than the RSs as unicast communication data to the unicast demodulation unit 2206. Like the separation unit 2203-1, the separation unit 2203-2 also separates RSs. The separation unit 2203-2 outputs RS1' corresponding to RS1 and RS2' corresponding to RS2 to the offset estimation unit 2204 and the unicast channel estimation unit 2205. The separation unit 2203-2 outputs the other unicast communication data to the unicast demodulation unit 2206.

The RS is inserted into a predetermined position in a symbol in FIG. 8. However, the RS may be frequency-shifted and inserted for each base station, or may be temporally hopped and inserted. In this case, the separation units 2203-1 and 2203-2 can specify RS positions by base station identification information. The separation units 2203-1 and 2203-2 extract the specified RSs and output the extracted specified RSs to the offset estimation unit 2204 and the unicast channel estimation unit 2205. The separation units 2203-1 and 2203-2 output symbols of the other data parts to the unicast demodulation unit 2206.

The offset estimation unit 2204 detects phase changes by lapses of time of the RSs RS1, RS2, RS1', and RS2' input from the separation units 2203-1 and 2203-2, and estimates a frequency error.

The offset estimation unit 2204 synchronizes a frequency of the base station with that of the terminal 200 by correcting a frequency of the temperature-compensated crystal oscillator 2210 based on the estimated frequency error. The unicast channel estimation unit 2205 performs channel estimation by the known minimum mean square error-channel (MMSE-CH) estimation method based on the input RS1, RS2, RS1', and RS2'. The channel estimation method is not limited to the MMSE-CH estimation method, and other estimation methods may be used.

Channel estimation values estimated by the unicast channel estimation unit 2205 are input to the unicast demodulation unit 2206. The unicast demodulation unit 2206 corrects and demodulates data Data 1 and Data 2 input from the separation units 2203-1 and 2203-2 by the estimation values input from the unicast channel estimation unit 2205.

The data demodulated by the unicast demodulation unit 2206 as described above is processed as unicast data. The terminal 200 operates as a 2×2 MIMO receiver by performing the process as described above.

Next, the operation when the terminal 200 receives an MBMS signal transmitted by the base station 100*a* will be described. If the terminal 200 receives the MBMS signal, it is possible to receive only the MBMS signal. For example, if there is an incoming signal of voice communication even when the terminal 200 receives an MBMS video, one of the two antenna units 20-1 and 20-2 is allocated for use in unicast signal reception, and the other is allocated for use in MBMS signal reception, so that a phone call can be received.

In FIG. 5, the RF reception unit 2201-1, the FFT processing unit 2202-1, the separation unit 2203-1, and the synthesizer unit 2207-1 are used for the unicast signal reception. Also, the RF reception unit 2201-2, the FFT processing unit 2202-2, the separation unit 2203-2, and the synthesizer unit 2207-2 are used for the MBMS signal reception.

If the terminal 200 receives the MBMS signal, the antenna unit 20-1 is used to receive unicast signals. The temperature-compensated crystal oscillator 2210 is set to the reference frequency f0. The synthesizer unit 2207-1 generates the local frequency signal fcu to receive the unicast signals based on the reference signal f0.

The unicast signal received by the antenna unit 20-1 is converted into a baseband signal by the RF reception unit 2201-1 based on the local frequency fcu. The RF reception unit 2201-1 removes CPs from the baseband signal, and outputs the results to the FFT processing unit 2202-1.

The FFT processing unit 2202-1 performs signal processing by an FFT and converts time domain signals into frequency domain signals. The frequency domain signals are input to the separation unit 2203-1. The separation unit 2203-1 separates the received signals into RSs and data based on a data arrangement, which is predetermined with the base station 100*a*.

The RSs are input to the offset estimation unit 2204 and the unicast channel estimation unit 2205. The data is input to the unicast demodulation unit 2206. The offset estimation unit 2204 estimates a frequency error based on time changes of phases of the input RSs. The offset estimation unit 2204 corrects a frequency of the temperature-compensated crystal oscillator 2210 in response to the frequency error, and adjusts the output frequency of the temperature-compensated crystal oscillator 2210.

Thereby, a reference frequency signal of the temperature-compensated crystal oscillator 2210 is synchronized with the frequency of the base station, which receives the unicast signals.

The unicast channel estimation unit 2205 performs estimation on the input RSs using the MMSE-CH estimation method. The estimation results are input to the unicast demodulation unit 2206.

The unicast demodulation unit 2206 corrects data input from the separation unit 2203-1 by estimation values input from the unicast channel estimation unit 2205, and demodulates unicast data. The demodulated unicast data is processed in response to a type of data such as a control signal of a wireless protocol, audio data, or image data.

The antenna unit 20-2 of the terminal 200 receives an MBMS signal. The synthesizer unit 2207-2 generates the local frequency fcm for demodulating the MBMS signal transmitted at the center frequency f2 based on the reference frequency f0 generated by the temperature-compensated crystal oscillator 2210.

This local frequency fcm is input to the RF reception unit 2201-2. The RF reception unit 2201-2 converts an RF signal of the MBMS received by the antenna unit 20-2 into a baseband signal based on the local frequency fern.

The MBMS signal is also an OFDM signal into which a CP is inserted. The RF reception unit 2201-2 removes the CP and outputs the baseband signal to the FFT processing unit 2202-2.

The terminal 200 can receive the MBMS signal by combining signals simultaneously transmitted from a plurality of base stations.

Figure 9:
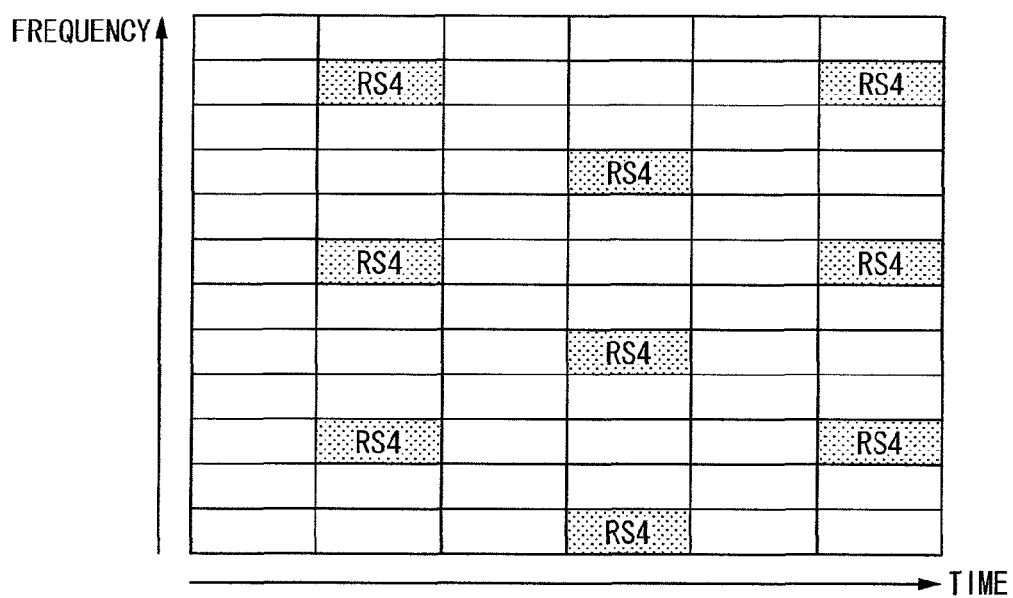
FIG. 9 is a diagram showing an example of an MBMS signal transmitted from the base station to the terminal according to the first embodiment of the present invention.

FIG. 9 is a diagram showing an example of an MBMS signal transmitted from the base station 100a to the terminal 200 according to the first embodiment of the present invention. In FIG. 9, the horizontal axis is a time axis, and the vertical axis is a frequency axis. In FIG. 9, one box represents one resource element. In FIG. 9, 12 subcarriers are arranged in a frequency-axis direction, and one subframe (1 ms) including 6 symbols is arranged in a time-axis direction.

The MBMS can be received by combining signals from a plurality of base stations, and has a possibility that a further delayed signal may be received compared to unicast communication. Thus, a CP of the MBMS is set to be longer than that of the unicast communication.

For example, a subcarrier interval is 7.5 kHz. In the MBMS, a signal is transmitted from one antenna of the base station without performing communication by MIMO. Thus, in the MBMS, the RS serves as only an RS of an MBMS antenna.

Thus, the total number of symbols and the number of RS symbols are different from the unicast communication. The MBMS signal is appropriately arranged in conjunction with the number of symbols.

By this symbol configuration, the MBMS signal transmitted from the base station is input to the FFT processing unit 2202-2. The FFT processing unit 2202-2 converts the input baseband signal from a time domain signal into a frequency domain signal by signal processing of an FFT. The MBMS signal converted into the frequency domain signal is input to the separation unit 2203-2.

In the MBMS, an RS arrangement is predetermined between the base station and the terminal. The separation unit 2203-2 separates an RS and data based on the predetermined arrangement, outputs the RS to the MBMS channel estimation unit 2211, and outputs a data signal to the MBMS demodulation unit 2212.

The MBMS channel estimation unit 2211 performs channel estimation based on the input RS and the MMSE-CH estimation method or the like. As in the unicast communication, other estimation methods may be used.

A channel estimation value of the MBMS signal estimated as described above is output to the MBMS demodulation unit 2212. The MBMS demodulation unit 2212 corrects and demodulates the MBMS data input from the separation unit 2203-2 by the channel estimation value from the MBMS channel estimation unit 2211.

The MBMS data includes image data, audio data, and the like. The data is displayed on a screen provided on a mobile phone by an application corresponding to a service, or is played as music data by a speaker, an earphone, or the like.

The above is the operation of the terminal 200 when MBMS signal reception and unicast signal communication are simultaneously performed. During the MBMS signal reception, the unicast communication is usually in a standby state. In the standby state of the unicast communication, the terminal 200 receives paging of notification once every several seconds to several tens of seconds. The terminal 200 checks whether or not there is an incoming signal directed to its own terminal or whether or not it is necessary to output location information. In the case in which a call connection by a user operation is not made when there is no notification of an incoming signal by paging, the unicast communication continues a state in which paging is received once every several second to several tens of seconds.

In this case, since offset estimation is not performed based on data of a receiver of the unicast signals, offset estimation is performed at a receiver of an MBMS signal. If no paging is received at the receiver of the unicast signal, the RF reception unit 2201-1, the FFT processing unit 2202-1, the separation unit 2203-1, and the synthesizer unit 2207-1 wait in the standby state, and minimize power consumption.

The antenna unit 20-2 receives the MBMS signal. The synthesizer unit 2207-2 is set to the local frequency fcm. The MBMS signal received by the antenna unit 20-2 is converted into a baseband signal by the RF reception unit 2201-2, and is converted into a frequency domain signal by the FFT processing unit 2202-2. The frequency domain signal is output to the separation unit 2203-2.

The separation unit 2203-2 outputs an RS of the separated MBMS signal to the offset estimation unit 2204 and the MBMS channel estimation unit 2211. Also, the separation unit 2203-2 outputs the data signal to the MBMS demodulation unit 2212. The offset estimation unit 2204 performs offset estimation based on the RS of the MBMS signal, and performs correction of the temperature-compensated crystal oscillator 2210.

The MBMS demodulation unit 2212 performs demodulation based on estimation data of the MBMS channel estimation unit 2211 and MBMS data from the separation unit 2203-2, and outputs the MBMS data.

By performing the above process, the terminal 200 can receive the MBMS signal even when the receiver of the unicast signals is in the standby state. If the receiver of the unicast signals performs a paging reception operation, the same process as that of the above-described unicast signal communication state is performed so that the receiver of the unicast signals is in the communication state.

If only the unicast signals are communicated by performing this operation, the terminal 200 can transmit/receive high-speed data to/from the base station as a MIMO receiver. Also, if the MBMS signal is received, the terminal 200 can perform unicast signal communication with the base station.

For example, when a video service or the like is watched by the terminal 200 using the MBMS communication, the terminal 200 can receive an incoming signal even when the unicast signals are received.

Here, the case where the unicast signals are received simultaneously upon receipt of the MBMS signal will be described. However, if the unicast signal reception is unnecessary, it is possible to reduce power consumption by preventing power supply to a reception system for receiving the unicast signals.

In the unicast signal reception, the terminal 200 operates like a general MIMO receiver. Accordingly, even when the base station provides a service in which an MBMS signal and unicast signals are transmitted to the terminal by time division in one frequency band, the terminal 200 can simultaneously receive the MBMS signal and the unicast signals.

During the MBMS signal reception, the terminal 200 performs offset correction by an RS of the MBMS signal. Thereby, when the receiver of the unicast signals receives paging, the temperature-compensated crystal oscillator 2210 can operate in a state in which it is substantially synchronized with the base station, so that the reception quality of the paging can be improved.

In the above-described embodiment, the transmission units 11 (referred to as signal transmission units) of the base stations 100a and 100b (also referred to as radio transmission devices or transmission devices) transmit unicast signals or MBMS signals as a type of multicast signal to the terminal 200 (also referred to as a radio reception device).

The plurality of RF reception units 2201-1 and 2202-2 (also referred to as signal reception units) of the terminal 200 receive the unicast signals or the MBMS signals from the base stations 100a and 100b.

In the case in which the control unit 23 (also referred to as a first control unit) of the terminal 200 receives only unicast signals from the base stations 100a and 100b, the unicast signals are received from the base stations 100a and 100b using all of the plurality of RF reception units 2201-1 and 2201-2.

In the case in which the control unit 23 (also referred to as a second control unit) of the terminal 200 receives unicast signals and MBMS signals, the control unit 23 receives the unicast signals from the base stations 100a and 100b using the RF reception units 2201-1 of the plurality of RF reception units 2201-1 and 2201-2, and also receives the MBMS signals from the base stations 100a and 100b using the other RF reception unit 2201-2 of the plurality of RF reception units 2201-1 and 2201-2.

That is, in a wireless communication system in which an MBMS signal is transmitted in a dedicated frequency band, the terminal 200 includes the plurality of RF reception units (the RF reception units 2201-1 and 2201-2), the plurality of FFT processing units (the FFT processing units 2202-1 and 2202-2), the plurality of channel estimation units (the unicast channel estimation units 2205 and the MBMS channel estimation unit 2211), and the plurality of demodulation units (the unicast demodulation unit 2206 and the MBMS demodulation unit 2212).

If only the unicast communication is performed, the control unit 23 of the terminal 200 operates all of the plurality of RF reception units, the plurality of FFT processing units, and the plurality of channel estimation units as MIMO transceivers.

If the MBMS communication and the unicast communication are simultaneously performed, the control unit 23 of the terminal 200 operates some of the plurality of RF transmission/reception units, the plurality of FFT processing units, the plurality of channel estimation units, and the plurality of demodulation units for use in the MBMS communication, and operates the other RF reception unit, the other FFT processing unit, the other channel estimation unit, and the other demodulation unit for use in the unicast communication, so that unicast signal transmission/reception and MBMS signal reception are simultaneously performed.

According to the first embodiment of the present invention, MBMS communication and unicast communication can be simultaneously performed even when a dedicated terminal for the MBMS communication is not provided.

It is possible to receive an incoming signal by a long term evolution (LTE) reception system without a dual reception system with another wireless access system (a 3rd generation (3 G) system, a global system for mobile communications (GSM), or the like) even in an MBMS dedicated cell.

In the case in which the offset estimation unit 2204 of the terminal 200 receives unicast signals and MBMS signals from the base stations 100a and 100b in this embodiment, offset estimation is performed using RSs included in the unicast signals. On the other hand, in the case in which the offset estimation unit 2204 of the terminal 200 receives only the MBMS signals from the base stations 100a and 100b without receiving the unicast signals from the base stations, offset estimation is performed using RSs included in the MBMS signals.

Thereby, communication qualities of both the unicast/MBMS can be highly maintained by performing offset estimation by the unicast signals upon unicast communication. If the unicast communication is in a stopped state, MBMS communication quality can be maintained by performing offset estimation by MBMS RSs. If incoming signals of unicast signals are received during MBMS signal reception, paging is received from a state in which it is substantially synchronized with a network in the MBMS, and thus the reception quality of paging is improved.

The terminal 200 for 2×2 MIMO has been described in this embodiment, but this embodiment may be applicable to a terminal corresponding to MIMO reception in which the number of receiving antennas for 4×4 MIMO is greater than or equal to 2. The configuration of a terminal corresponding to MIMO reception in which the number of receiving antennas is greater than or equal to 2 will be described later.

Second Embodiment

Next, a second embodiment of the present invention will be described. Descriptions of parts of the second embodiment of the present invention having the same configurations as those of the first embodiment will be omitted.

The terminal 200 of the second embodiment has a reception unit 22b in place of the reception unit 22a provided in the terminal 200 according to the first embodiment.

Figure 10:
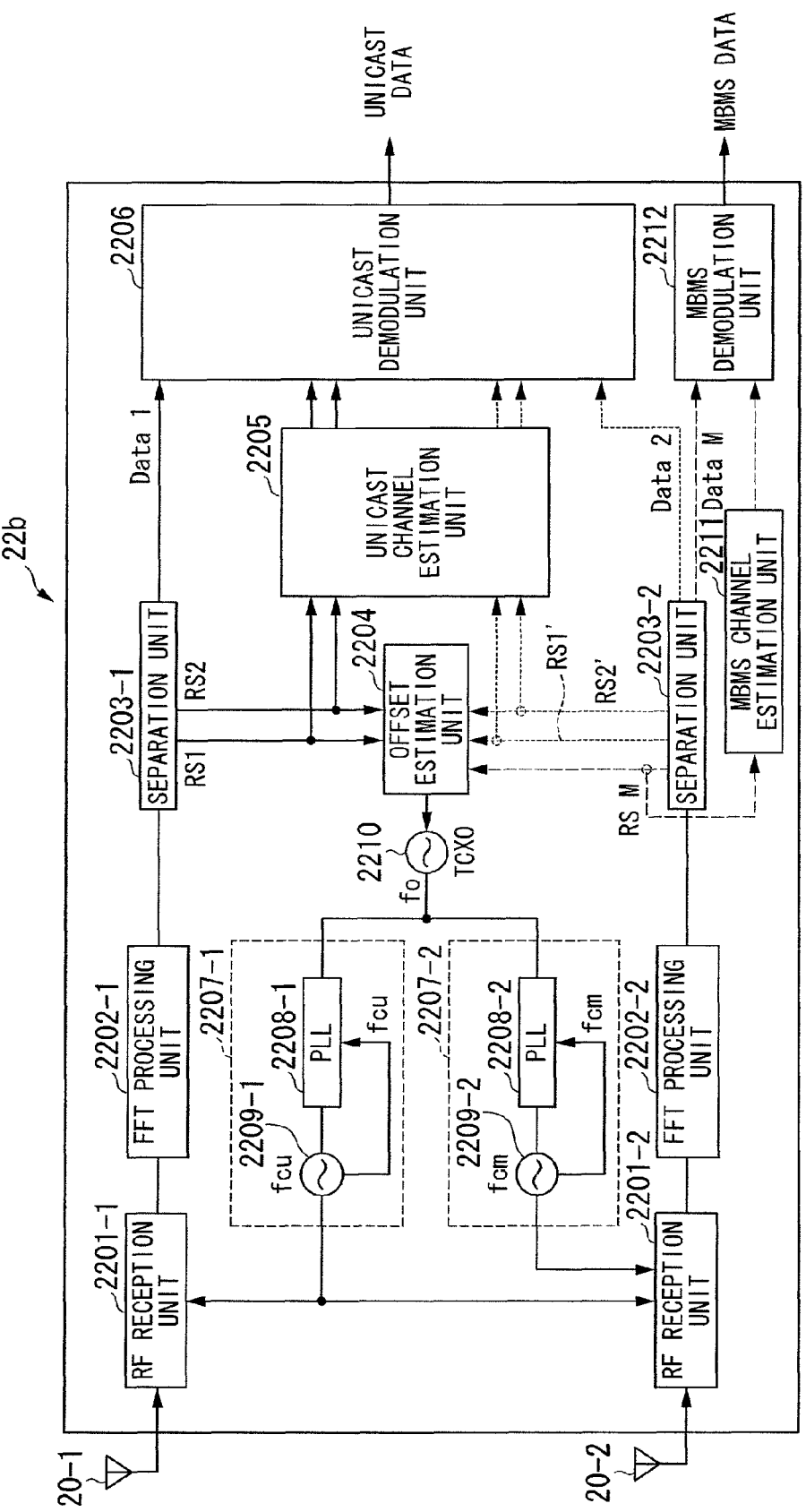
FIG. 10 is a schematic block diagram showing the configuration of a reception unit of a terminal according to a second embodiment of the present invention.

FIG. 10 is a schematic block diagram showing the configuration of the reception unit 22b of the terminal 200 according to the second embodiment of the present invention. The same reference symbols are assigned to parts of the reception unit 22b having the same configurations as those of the reception unit 22a (FIG. 5), and descriptions thereof will be omitted.

Processes of the synthesizer units 2207-1 and 2207-2 of the reception unit 22b according to the second embodiment are different from those of the synthesizer units 2207-1 and 2207-2 of the reception unit 22a according to the first embodiment.

An arrow indicated by a dashed line in FIG. 10 indicates a signal which flows when a unicast signal is received. An arrow indicated by a dotted line in FIG. 10 indicates a signal which flows when an MBMS signal is received.

In the second embodiment, the synthesizer unit 2207-1 is used for unicast signal communication and the synthesizer unit 2207-2 is used for MBMS signal reception. If only unicast communication is performed, the local signal fcu generated by the synthesizer unit 2207-1 is output to the RF reception unit 2201-1 and the RF reception unit 2201-2.

The RF reception unit 2201-1 and the RF reception unit 2201-2 convert received RF signals into baseband signals based on the local signal generated by the synthesizer unit 2207-1.

Since the other operations are the same as those of the first embodiment, descriptions thereof are omitted.

When the terminal 200 receives the MBMS signal, the local frequency fcm from the synthesizer unit 2207-2 is input to the RF reception unit 2201-2. For example, a switch circuit for selectively using the local signal fcu from the synthesizer unit 2207-1 and the local signal fern from the synthesizer unit 2207-2 is integrated into the RF reception unit 2201-2. When the MBMS signal is received, the control unit 23 (FIG. 3) switches the RF reception unit 2201-2 to receive the local signal of the synthesizer unit 2207-2.

The RF reception unit 2201-2 converts the received MBMS signal into a baseband signal using the local signal from the synthesizer unit 2207-2. The other operations are the same as those of the first embodiment.

By this configuration, when MIMO reception is performed by unicast communication, local frequency signals inserted into the RF reception units 2201-1 and 2202-2 of the antenna units are completely synchronized therewith. Thereby, stable MIMO reception can be performed. In the case in which the terminal 200 receives only unicast signals from the base stations 100a and 100b, the synthesizer unit 2207-2 is powered off. Thereby, power consumption can be reduced compared to the first embodiment when MIMO reception is performed by unicast communication.

Third Embodiment

Next, a third embodiment of the present invention will be described. Descriptions of parts of the third embodiment of the present invention having the same configurations as those of the first embodiment will be omitted.

The terminal 200 of the third embodiment has a reception unit 22c in place of the reception unit 22a provided in the terminal 200 according to the first embodiment.

Figure 11:
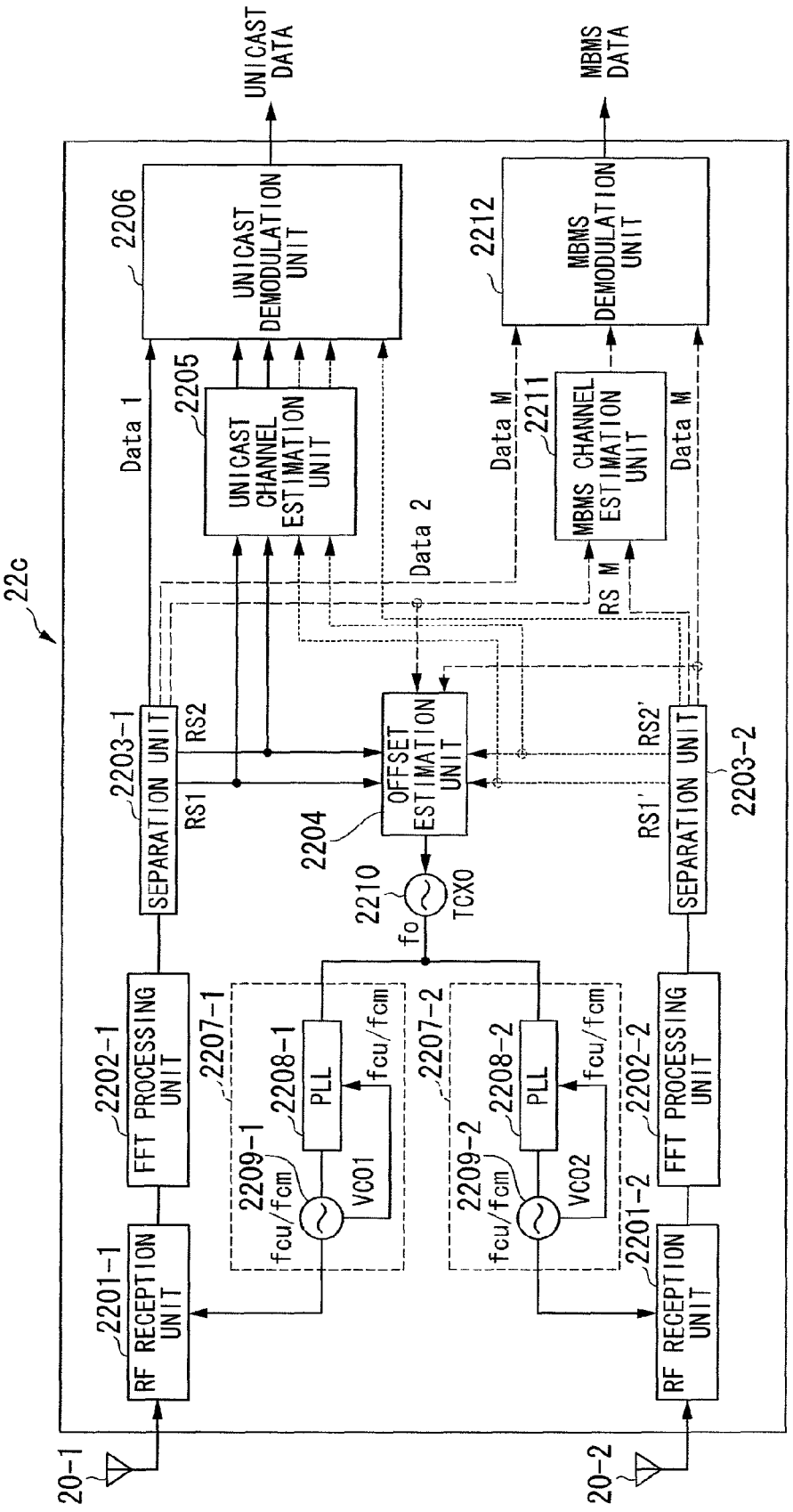
FIG. 11 is a schematic block diagram showing the configuration of a reception unit of a terminal according to a third embodiment of the present invention.

FIG. 11 is a schematic block diagram showing the configuration of the reception unit 22c of the terminal 200 according to the third embodiment of the present invention. The same reference symbols are assigned to parts of the reception unit 22c having the same configurations as those of the reception unit 22a (FIG. 5), and descriptions thereof will be omitted.

An arrow indicated by a dotted line in FIG. 11 indicates a signal which flows when a unicast signal is received. An arrow indicated by a dashed line in FIG. 11 indicates a signal which flows when an MBMS signal is received.

The reception unit 22c of the third embodiment can also output an MBMS RS or an MBMS data signal from the separation unit 2203-1 to the MBMS channel estimation unit 2211, the MBMS demodulation unit 2212, and the offset estimation unit 2204, and can also receive an MBMS signal from the antenna unit 20-1.

In this configuration, the operation when the antenna unit 20-1 receives unicast signals and the antenna unit 20-1 receives an MBMS signal is the same as that of the first embodiment described with reference to FIG. 5.

In this regard, in the third embodiment, when the unicast communication is in a standby state and the RF reception unit 2201-1, the FFT processing unit 2202-1, and the separation unit 2203-1 are in a standby state with paging listening, the RF reception unit 2201-1, the FFT processing unit 2202-1, and the separation unit 2203-1 are started to check a reception state of the MBMS signal. When the MBMS signal is received, the MBMS signal is processed and demodulated through the RF reception unit 2201-2, the FFT processing unit 2202-2, and the separation unit 2203-2. In parallel therewith, the local frequency is set to fcm by the synthesizer unit 2207-1, and the MBMS signal received by the antenna unit 20-1 is received.

The RF reception unit 2201-1 converts the received MBMS signal into a baseband signal and the reception level thereof is checked. Likewise, the RF reception unit 2201-2 also measures a reception level. If the reception level of the antenna unit 20-1 is higher, an MBMS signal reception system is changed to the side of the antenna unit 20-1.

Thereby, an MBMS signal is received at the side of the antenna unit 20-1, and unicast signals are received at the side of the antenna unit 20-2. Specifically, the RF reception unit 2201-2 down-converts the MBMS signal received by the antenna unit 20-1 by setting the local frequency of the synthesizer unit 2207-1 to fcm. The MBMS signal converted into a baseband signal is converted by the FTT processing unit 2201-1 from a time domain signal into a frequency domain signal. The separation unit 2203-1 separates an RS RS-M and a data part based on a symbol pattern of the MBMS signal.

The RS is output to the MBMS channel estimation unit 2211 and the offset estimation unit 2204. The offset estimation unit 2204 performs offset estimation based on the RS RS-M received by the antenna unit 20-1, and performs correction of the temperature-compensated crystal oscillator 2210. Estimation data estimated by the MBMS channel estimation unit 2211 is output to the MBMS demodulation unit 2212, and MBMS data is demodulated in conjunction with MBMS data output from the separation unit 2203-1.

While the RF reception unit 2201-2, the FFT processing unit 2202-2, and the separation unit 2203-2 are in a paging listening state, the RF reception unit 2201-2 equally measures a reception level of an MBMS signal. If the reception quality of the antenna unit 20-2 is higher than that of the antenna unit 20-1, the MBMS signal reception system can be changed to the antenna unit 20-2.

If the paging is received, unicast data is demodulated. The offset estimation unit 2204 performs offset estimation using unicast RSs output from the separation unit 2203-2, and performs correction of the temperature-compensated crystal oscillator 2210.

Thereby, the terminal 200 of the third embodiment can receive an MBMS signal by constantly selecting an antenna having good reception characteristics. Thus, it is possible to improve throughput characteristics of the terminal 200.

Fourth Embodiment

Next, a fourth embodiment of the present invention will be described. Descriptions of parts of the fourth embodiment of the present invention having the same configurations as those of the first embodiment will be omitted.

The terminal 200 (FIG. 3) according to the first embodiment has the two antenna units 20-1 and 20-2, but the terminal 200 according to the fourth embodiment has N antenna units 20-1 to 20-N (N is an integer greater than or equal to 3).

The terminal 200 of the fourth embodiment has a reception unit 22d in place of the reception unit 22a provided in the terminal 200 according to the first embodiment.

Figure 12:
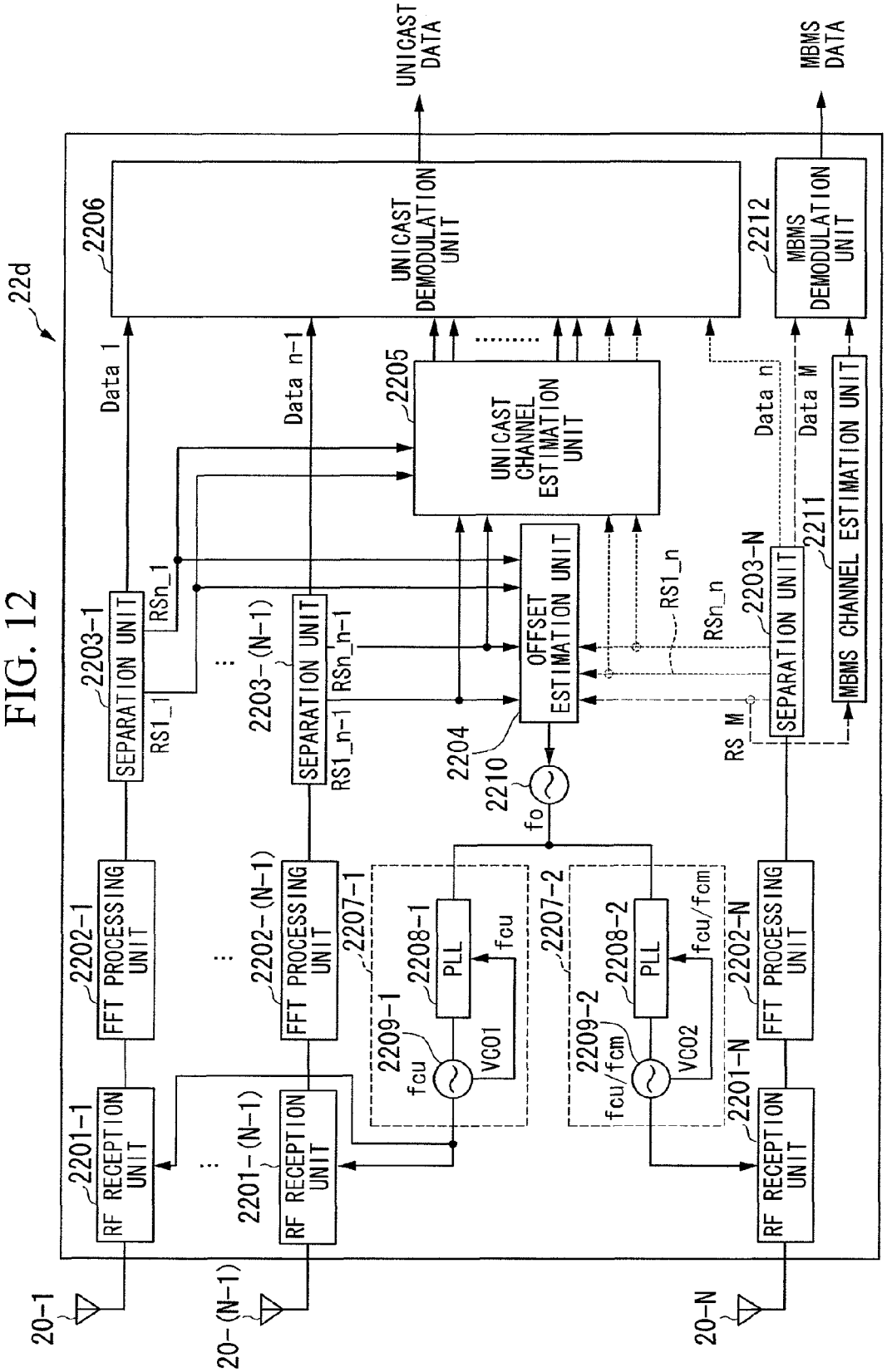
FIG. 12 is a schematic block diagram showing the configuration of a reception unit of a terminal according to a fourth embodiment of the present invention.

FIG. 12 is a schematic block diagram showing the configuration of the reception unit 22d of the terminal 200 according to the fourth embodiment of the present invention. The same reference symbols are assigned to parts of the reception unit 22*d* having the same configurations as those of the reception unit 22*a* (FIG. 5), and descriptions thereof will be omitted.

An arrow indicated by a dotted line in FIG. 12 indicates a signal which flows when a unicast signal is received. An arrow indicated by a dashed line in FIG. 12 indicates a signal which flows when an MBMS signal is received.

The reception unit 22*d* according to the fourth embodiment is different from the reception unit 22*a* according to the first embodiment in that the reception unit 22*d* has N RF reception units, N FFT processing units, and N separation units, that is, has RF reception units 2201-1 to 2201-(N−1), and 2201-N, FFT processing units 2201-1 to 2201-(N−1), and 2201-N, and separation units 2203-1 to 2203-(N−1), and 2203-N. When N=2, the reception unit 22*d* corresponds to the reception unit 22*a* according to the first embodiment.

The antenna units 20-1 to 20-N are respectively connected to the RF reception units 2201-1 to 2201-N. The reception unit 22*d* does not have a switching function of the synthesizer units 2207-1 and 2207-2.

Processing parts of the RF reception units 2201-1 to 2201-(N−1) perform a process for unicast signal reception. The RF reception units 2201-1 to 2201-N are connected to the synthesizer unit 2207-1 for the unicast signal reception.

The RF reception unit 2201-N performs a process for the unicast signal reception or MBMS signal reception. The RF reception unit 2201-N connected to the synthesizer unit 2207-2 is switched to the frequency fcu if the unicast communication is performed, and is switched to the frequency fcm if the MBMS communication is performed. The other processes are the same as those of the reception unit 22*a* according to the first embodiment.

In the case in which the terminal 200 receives only the unicast signals, a MIMO reception operation is performed by allocating all the antenna units to the unicast signal reception. In the case in which the MBMS signal reception as well as the unicast signal reception is simultaneously performed, the antenna unit 20-N is allocated for the MBMS signal reception, and for the unicast signal reception, MIMO reception is performed using the antenna units 20-1 to 20-(N−1).

In this regard, if a service of MIMO receptions by N−1 antennas is not received in a wireless communication system, MIMO reception is performed by a maximum number of antenna units via which a service is received. For example, the terminal 200 performs MIMO reception using N−2 antenna units. In this case, the terminal 200 does not use only one antenna unit.

In the above-described reception unit 22*d*, one antenna unit is allocated for the MBMS signal reception. However, a plurality of antenna units may also be allocated to the MBMS signal reception in a wireless communication system in which MIMO transmission/reception can be performed even in MBMS communication.

In the case where the terminal 200 has N antenna units, the synthesizer units 2207-1 and 2207-2 may be switched as shown in FIG. 10.

FIGS. 13 to 16 are sequence diagrams showing processes between the base station and the terminal 200 according to the embodiments of the present invention. In the unicast communication, the base station checks the terminal capacity of the terminal 200. A connection scheme between the terminal and the base station is determined based on whether 4×4 MIMO communication is possible, whether 2×2 MIMO communication is possible, or whether only the reception capacity of one antenna is provided, and based on a network state at the time, contractual coverage of a user, and the like in addition to the terminal capacity, and communication is established in the determined scheme.

Here, the capacity of the terminal 200 is different according to whether or not an MBMS signal is received. Thus, the base station is notified of terminal capacity information and an appropriate call connection is made.

Figure 13:
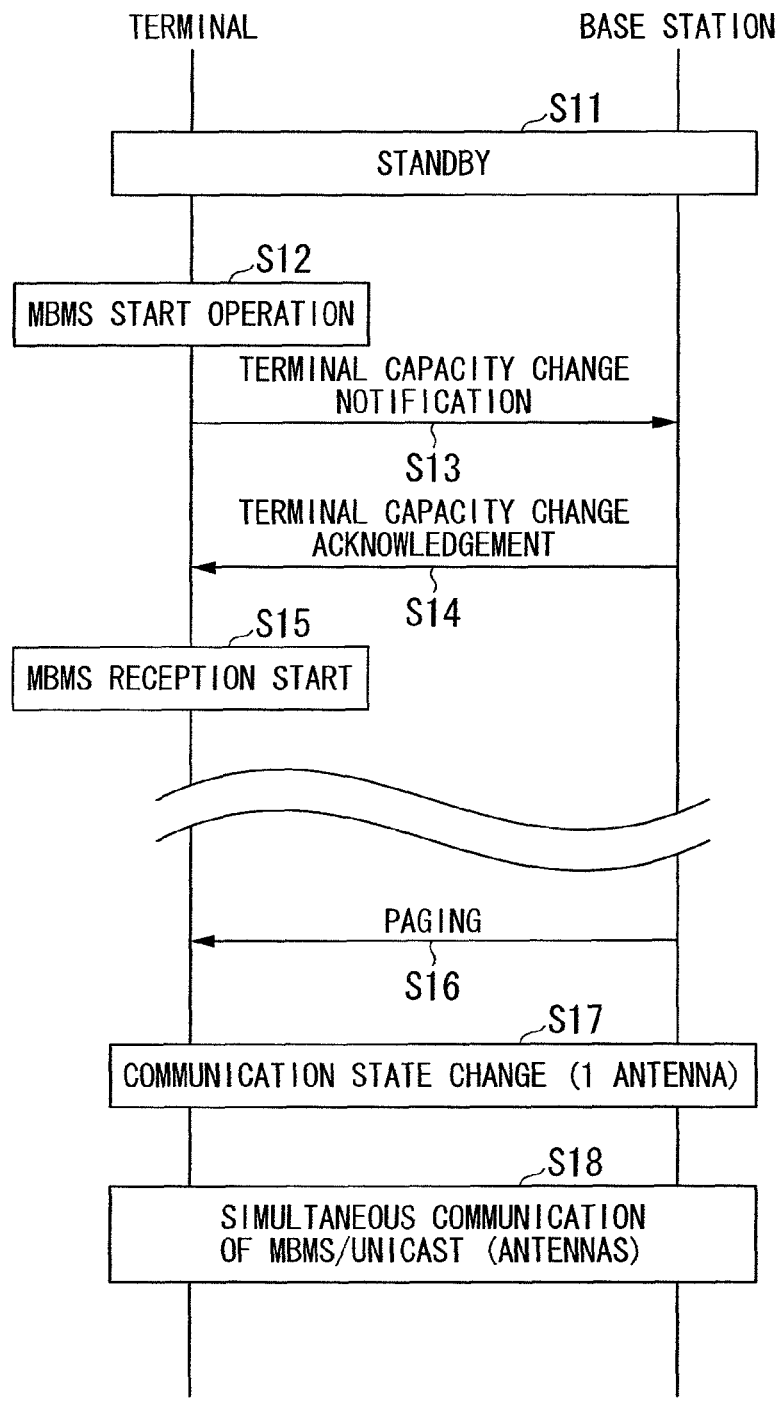
FIG. 13 is a sequence diagram showing a process when MBMS signal reception from the base station is started during a standby state of the terminal.

FIG. 13 is a sequence diagram showing a process when MBMS signal reception from the base station is started during the standby state of the terminal 200. In the standby state in which the terminal 200 does not receive an MBMS signal (step S11), the base station registers a location of the terminal 200 for unicast communication. For example, if there is an incoming signal to the terminal 200, the terminal 200 waits in a state in which a call connection is possible based on a notification by paging or the like.

In this state, the terminal 200 is in a state in which MIMO communication is possible. Here, it is in a state in which 2×2 MIMO communication is possible based on terminal capacity notified upon location registration.

For example, if maximum 4×4 MIMO communication is possible, 4×4 MIMO is set as the maximum capacity upon location registration of the terminal 200.

If the terminal 200 and the base station perform the unicast communication in this state, user data corresponding to the 2×2 MIMO communication is transmitted from the terminal 200 to the base station when the base station communicates with the terminal 200. Thereby, the 2×2 MIMO communication can be performed between the base station and the terminal 200.

Here, if a user of the terminal 200 performs an MBMS start operation (step S12), one system of two communication systems is used for MBMS signal reception. Thus, subsequently, the unicast communication needs to perform communication using one antenna and the base station needs to be notified thereof.

If no notification is transmitted from the terminal 200 to the base station, the base station transmits user data as data directed to the terminal 200 of the 2×2 MIMO communication as maximum communication capacity. Thus, the terminal 200 capable of using only one antenna may not perform normal unicast communication.

Here, if the user performs an MBMS start process, the terminal 200 temporarily suspends the MBMS start process. The terminal 200 transmits control data (also referred to as a terminal capacity change notification message) to the base station to notify the base station of a terminal capacity change (step S13).

The terminal capacity change notification message includes data indicating the maximum capacity capable of being used by the terminal 200 at the time. In this example, one system of the two communication systems is used in the MBMS. Thus, since it is only possible to perform transmission/reception using one antenna, the terminal 200 notifies the base station of the capacity of one antenna.

The base station receives the terminal capacity change notification from the terminal 200. Thereby, the base station can recognize the fact that the terminal 200 has the capacity of 2×2 MIMO communication as the maximum communication capacity, but only one antenna can be used based on an operation state of the terminal after the message reception.

The base station changes the maximum capacity to one antenna when communication of the terminal 200 is performed. If the change process is completed, the base station transmits, to the terminal 200, control data (also referred to as a terminal capacity change acknowledgement message) to notify the terminal 200 of the fact that the terminal capacity change is acknowledged (step S14).

The terminal capacity change acknowledgement message includes capacity by which communication with the base station is performed if the terminal 200 communicates with the base station after the message reception, and a setting timing thereof.

Here, since the terminal 200 notifies the base station of the capacity of one antenna, the terminal capacity change acknowledgement message includes data indicating that communication is performed using one antenna. At this time, since communication is not performed, a timing indicating the next communication start time as a switching timing is set so that an operation is performed using one antenna when the next communication is performed.

When the terminal capacity change acknowledgement message is received from the base station, the terminal 200 completes unicast communication. Since the 2×2 MIMO communication is set as the terminal capacity upon location registration, the control data notification thereof can also perform the 2×2 MIMO communication. However, the communication is data communication for a small amount of only the control data, and accordingly, when the base station transmits the terminal capacity change acknowledgement message, the base station can designate a timing when an operation is performed using one antenna, and the terminal 200 can perform communication using the antenna after the designated timing.

If the terminal capacity notification is completed, the terminal 200 starts to receive the MBMS (step S15). In particular, if no unicast communication is generated, the terminal 200 receives an MBMS signal and also checks paging as to whether or not there is an incoming signal directed to its own terminal as a unicast signal at a predetermined timing (step S16).

The paging timing depends upon the settings of the base station, and thus is generally set to from about several seconds to several tens of seconds.

Thus, the terminal 200 performs a paging reception process for unicast signals to determine whether or not there is an incoming signal directed to its own terminal at a ratio of about once every several seconds to several tens of seconds. If there is no incoming signal directed to its own terminal, the terminal 200 iterates the process. When the terminal 200 receives paging through the unicast signals, for example, if a voice call is received, the terminal 200 performs a voice call connection process. Since the base station is notified of the operation of one antenna by the terminal capacity change notification, a voice communication connection by the unicast communication is made using the terminal 200 of one antenna (step S17).

As a result, the terminal 200 can be connected to the voice call during MBMS signal reception. For example, even when video data or the like is received by MBMS communication, the terminal 200 can check an incoming signal of voice communication by the unicast communication, and perform the voice communication (step S18).

At this time, an MBMS data process depends upon an application software process retained by the terminal 200. For example, it is possible to perform voice communication using an earphone/microphone and to continuously watch image data on a display of the terminal. Alternatively, the user can later watch data by storing the data in a memory embedded in the terminal 200 or an external memory such as an inserted SD card. For example, it is possible to perform packet communication such as a TV phone call, mail, or the like as the unicast communication as well as the voice communication.

Figure 14:
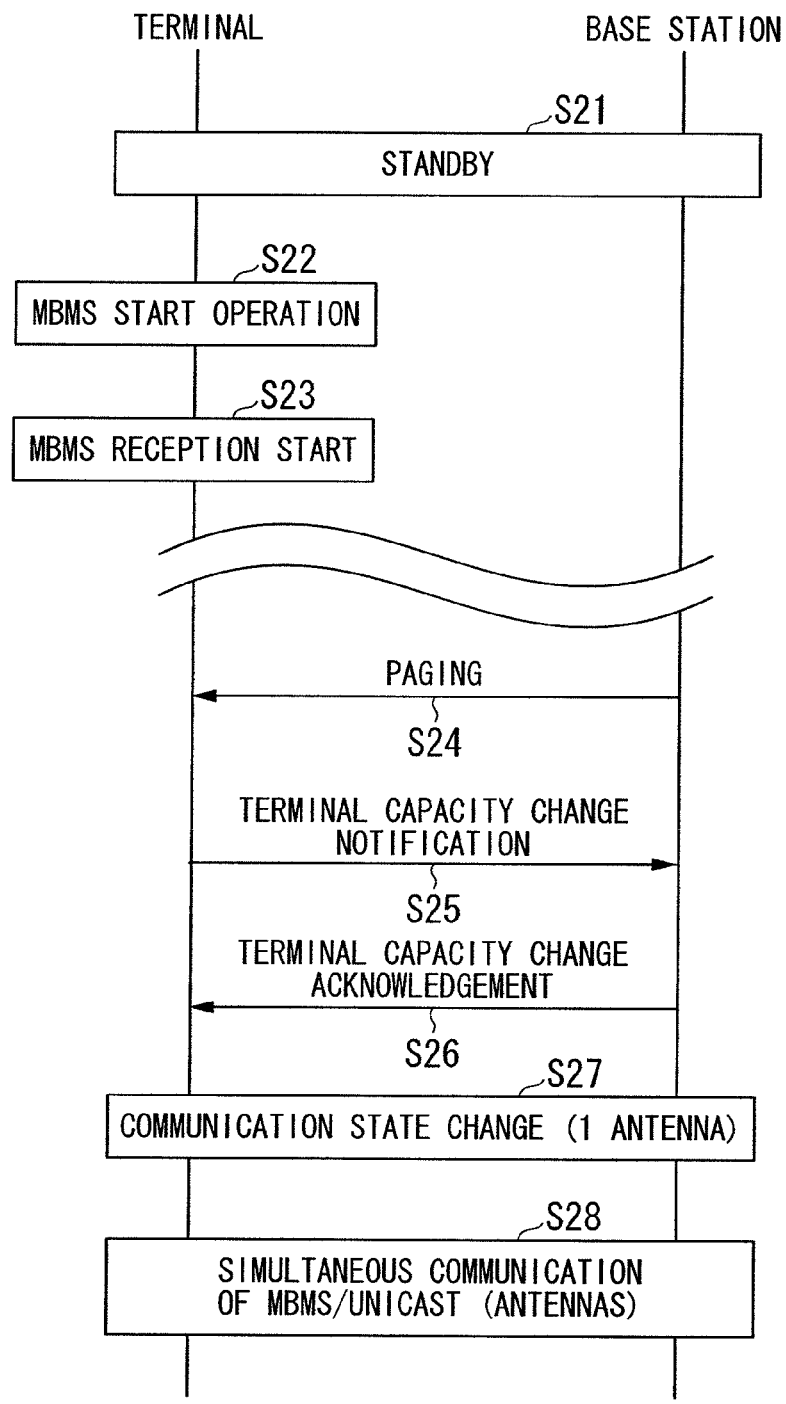
FIG. 14 is a sequence diagram showing a process of performing a terminal capacity notification from the terminal to the base station at a timing different from that described with reference to FIG. 13.

FIG. 14 is a sequence diagram showing a process of performing a terminal capacity notification from the terminal 200 to the base station at a timing different from that described with reference to FIG. 13. Here, if the terminal 200 communicates only control data, communication is performed using one antenna regardless of the capacity of the terminal 200 differently from FIG. 13. If synchronization of the base station with the terminal 200 is established and user data is communicated, high-speed data communication using MIMO is performed.

Here, even when the user starts MBMS reception by performing an MBMS start operation of the terminal 200 during the standby state of the terminal 200 (step S21), the terminal 200 does not immediately transmit a terminal capacity change notification to the base station. If the user performs an MBMS reception operation (step S22), the terminal 200 allocates one reception system for MBMS signal reception, allocates another system for unicast signal reception, and starts the MBMS signal reception (step S23).

During the MBMS reception, the terminal 200 checks paging at a predetermined interval as to determine whether or not there is an incoming signal directed to its own terminal at a receiver of a unicast signal as in the case in FIG. 13 (step S24). In this case, the paging is transmitted from the base station to the terminal 200 as data capable of being received using one antenna even when the terminal 200 has the capacity of 2×2 MIMO communication, and is not affected by reception of the MBMS signal.

If the terminal 200 receives the paging from the base station, the terminal 200 transmits the terminal capacity change notification to the base station (step S25). The base station transmits/receives a signal to/from the terminal 200 which performs communication of only control data, using one antenna. In this case, no problem occurs in the communication of control data even in a state in which the terminal 200 receives the MBMS. If the terminal 200 transmits the terminal capacity change notification message to the base station, the message is received by the base station, which performs the unicast communication.

The base station checks content of the message and directly determines that transmission/reception is performed using one antenna. The base station notifies the terminal 200 of the determination result using the terminal capacity change acknowledgement message (step S26). The terminal 200 continues transmission/reception using one antenna based on the determination result included in the terminal capacity change acknowledgement message (step S27), and establishes a unicast communication. By the procedure described above, the terminal 200 can perform the unicast communication during the MBMS signal reception (step S28).

The terminal 200 receives the MBMS in this example, but the base station determines that an operation is possible as the MIMO for two antennas by the terminal capacity change notification only if unicast communication is performed. In the terminal capacity change acknowledgement message, the terminal 200 is notified of the determination result of the operation of the two antennas and an operation start timing thereof. The terminal can be changed to 2×2 MIMO communication at the operation start timing included in the terminal capacity change acknowledgement and can implement high-speed communication using MIMO.

Figure 15:
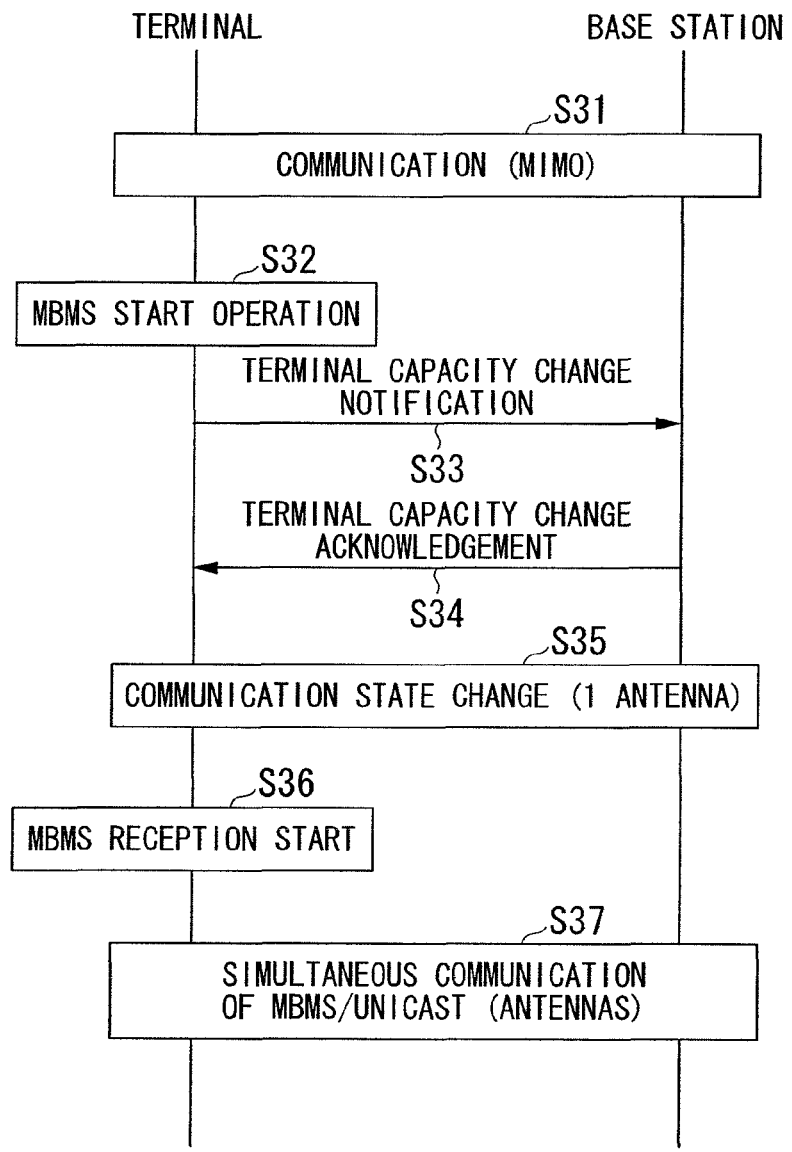
FIG. 15 is a sequence diagram showing a process when MBMS is started in the terminal during unicast communication.

FIG. 15 is a sequence diagram showing a process when the MBMS is started by the terminal 200 during the unicast communication. For example, this is the case where a service of providing video data or the like is provided by the MBMS or the case where a reservation for receiving and recording certain video data is made using a timer or the like in the terminal 200.

If the terminal 200 is performing voice communication using MIMO communication (step S31), the terminal 200 starts an MBMS start process when an MBMS reception time is reached (step S32). If an MBMS start request is generated, the process is suspended and the terminal 200 transmits a terminal capacity change notification message to the base station (step S33).

Signal transmission/reception is performed by 2×2 MIMO communication during the unicast communication, but the base station determines that a change to one antenna is necessary by the message transmission.

The terminal 200 is notified of the determination result and a change timing by the terminal capacity change acknowledgement message (step S34). The terminal 200 checks that a change to one antenna is permitted from the terminal capacity change acknowledgement, and makes a change to the reception using one antenna at a designated timing (step S35). When the change to one antenna is completed, one reception system can be used for MBMS reception and the terminal 200 starts the MBMS reception (step S36). Thereby, the terminal 200 can simultaneously receive an MBMS signal and unicast signals even when the MBMS reception is necessary during the unicast communication (step S37).

Figure 16:
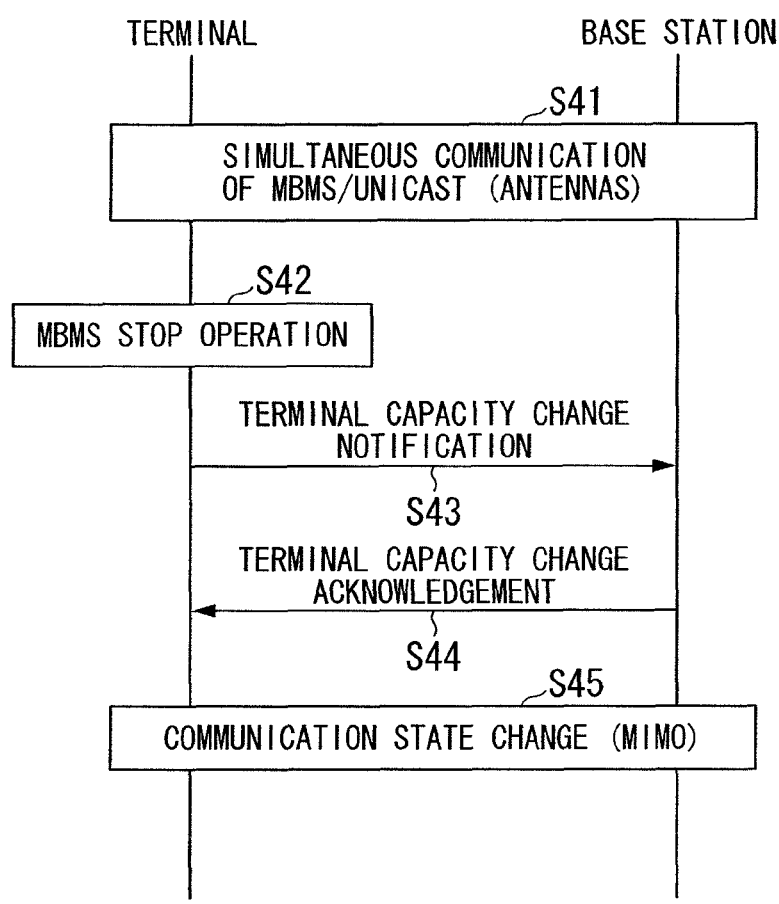
FIG. 16 is a sequence diagram showing a process when MBMS signal reception is terminated while simultaneous communication of unicast communication and MBMS communication is performed.

FIG. 16 is a sequence diagram showing a process when the MBMS signal reception is terminated during simultaneous communication of the unicast communication and the MBMS communication. If the MBMS signal reception is completed in the case where the terminal 200 simultaneously performs the MBMS communication and the unicast communication with the base station (step S41), high-speed communication can be performed when the 2×2 MIMO communication is performed as the unicast communication. Thus, when an MBMS stop process is requested by an operation of the user of the terminal 200, the terminal 200 performs the MBMS stop process (step S42).

Thereby, the terminal 200 is in a state in which the 2×2 MIMO communication can be performed. The terminal 200 requests a change of an operation state by a terminal capacity change notification to the base station (step S43). If the terminal capacity change notification is received from the terminal 200, the base station determines that the terminal 200 is operable in the 2×2 MIMO communication. The base station notifies the terminal 200 of a communication state change to the 2×2 MIMO communication and a change timing in a terminal capacity change acknowledgement message (step S44).

The terminal 200 checks that the base station permits MIMO reception by the terminal capacity change acknowledgement, and performs switching to the 2×2 MIMO communication at a designated timing (step S45). Thereafter, the terminal 200 can perform high-speed communication by performing an operation in the 2×2 MIMO communication. The above example shows a process when the terminal 200 receives incoming signals. If the terminal 200 transmits a call, a call operation of the user is performed instead of paging. In the other operation, it is possible to make a change to a simultaneous communication state of unicast communication and MBMS communication according to the above-described procedure.

The case where independent messages are used for the notification and acknowledgement of the terminal capacity change has been described, but the present invention is not limited thereto. For example, the notification toward the base station can be performed by setting a parameter for changing the number of reception systems using a normal call control message, and the base station can notify the terminal of a communication state change and a change timing using the normal call control message.

The case where 2×2 MIMO and a 1-antenna state are switched has been described in this example, but the present invention is not limited thereto. For example, if the terminal 200 retains maximum 4×4 MIMO communication capacity, a change can be made by the same procedure even in terms of switching of 1-antenna communication or 2×2 MIMO communication.

As described with reference to FIGS. 13 to 16, switching can be appropriately performed even when setting of MIMO or a single antenna is changed between the base station, which provides a unicast service, and the terminal 200 by the terminal 200 notifying the base station of the terminal capacity of the terminal 200. Even when the terminal 200 switches a transmission/reception method of MIMO or a single antenna during communication, the communication can be continuously performed.

If the terminal capacity of its own terminal is changed, the terminal 200 notifies the base station of a terminal capacity change. If the terminal capacity change is notified from the terminal 200, the base station switches a unicast signal transmission method to an appropriate method of MIMO or a single antenna. Thereby, it is possible to appropriately switch the setting of the MBMS, the MIMO, or the single antenna between the base station, which provides the unicast service, and the terminal.

If the base station notifies the terminal 200 of a change of unicast signal transmission and MBMS signal transmission, the terminal 200 is notified of change permission information for permitting the change and timing information indicating a change timing. Thereby, even when the unicast communication is being performed between the base station and the terminal 200, it is possible to change a communication scheme according to the terminal capacity of the terminal. The timing information includes a frame number, a slot number, or the like.

The configuration of the base station 100a as in FIG. 2 has been described in each embodiment described above, but the present invention is not limited thereto. For example, base stations 100a-1 and 100a-2 of the configurations shown in FIGS. 17A and 17B can be used. The same reference symbols are assigned to parts in FIGS. 17A and 17B having the same configurations as those in FIG. 2, and descriptions thereof are omitted.

Figure 17A:
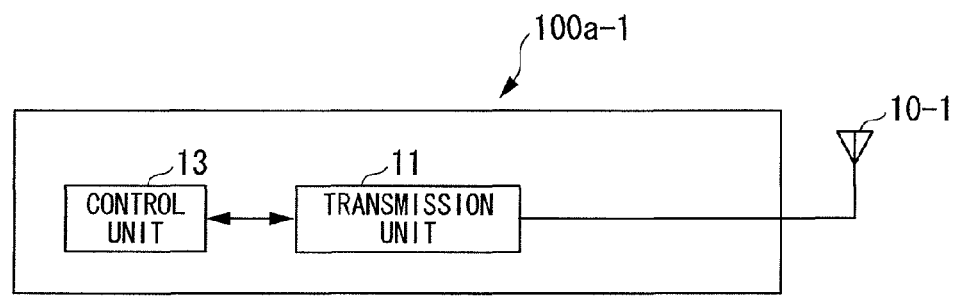
FIG. 17A is a schematic block diagram showing another configuration of the base station according to an embodiment of the present invention.

The base station 100a-1 in FIG. 17A has an antenna unit 10-1, a transmission unit 11, and a control unit 13. The base station 100a-1 transmits an MBMS signal to the terminal 200 by performing the process described with reference to FIG. 2.

Figure 17B:
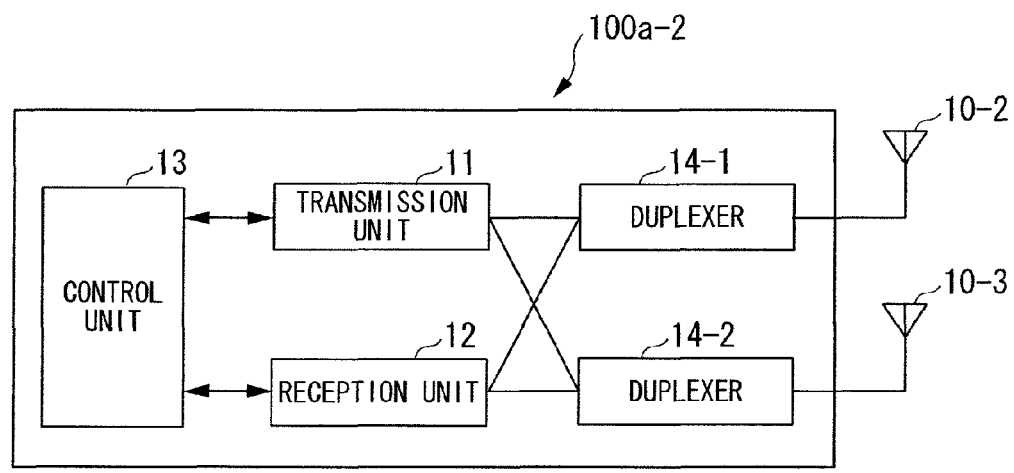
FIG. 17B is a schematic block diagram showing still another configuration of the base station according to an embodiment of the present invention.

The base station 100a-2 in FIG. 17B has antenna units 10-2 and 10-3, a transmission unit 11, a reception unit 12, a control unit 13, and duplexers 14-1 and 14-2. The base station 100a-2 transmits unicast signals to the terminal 200 by performing the process described with reference to FIG. 2.

A program for implementing a function of each part of a base station or a terminal according to each embodiment described above may be recorded on a computer-readable recording medium. The base station or the terminal may be controlled by reading the program recorded on this recording medium into a computer system. Here, the "computer system" may also include an operating system (OS) and hardware such as peripheral devices.

The "computer readable recording medium" is a portable medium such as a flexible disc, magneto-optical disc, ROM or CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication circuit such as a telephone circuit, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a communication system, a reception device, and a communication method, which simultaneously perform multicast communication and unicast communication even when a dedicated reception device for the multicast communication is not provided.

REFERENCE SYMBOLS 10-1 to 10-3: Antenna unit
11: Transmission unit
12: Reception unit
13: Control unit
14-1, 14-2: Duplexer
20-1, 20-2: Antenna unit
21: Transmission unit
22a to 22d: Reception unit
23: Control unit
24: Duplexer
100a, 100b: Base station
200: Terminal
1101: Mapping unit
1102-1 to 1102-3: Modulation unit
1103-1 to 1103-3: Symbol arrangement unit
1104-1 to 1104-3: IFFT processing unit
1105-1 to 1105-3: Radio unit
2201-1, 2201-2: RF reception unit
2202-1, 2202-2: FFT processing unit
2203-1, 2203-2: Separation unit
2204: Offset estimation unit
2205: Unicast channel estimation unit
2206: Unicast demodulation unit
2207-1, 2207-2: Synthesizer unit
2210: Temperature-compensated crystal oscillator
2211: MBMS channel estimation unit
2212: MBMS demodulation unit

The invention claimed is:

1. A communication system comprising a reception device and at least one transmission device,
wherein the transmission device comprises:
a signal transmission unit configured to transmit at least one unicast signal and multicast signal to the reception device, and
the reception device comprises:
first and second signal reception units configured to receive at least one the unicast signal and the multicast signal from the transmission device and to perform a reception process including demodulation and down-conversion;
a first control unit configured to receive the unicast signal from the transmission device using the reception processes of both of the first and second signal reception units in case that only the unicast signal is received; and
a second control unit configured to receive the unicast signal from the transmission device using the reception process of the first signal reception unit and without using the reception process of second reception unit, and simultaneously receive the multicast signal from the transmission device using the reception process of the second reception unit and without using the reception process of the first reception unit, in case that the unicast signal and the multicast signal are received.

2. The communication system according to claim 1, wherein the reception device comprises an offset estimation unit configured to perform offset estimation using reference signal included in the unicast signal in case that the unicast signal and the multicast signal are received, and perform offset estimation using reference signal included in the multicast signal in case that only the multicast signal is received.

3. The communication system according to claim 1, wherein the second control unit is configured to switch the first signal reception unit and the second signal reception unit in case that reception quality of the first signal reception unit is higher than reception quality of the signal reception unit.

4. The communication system according to claim 1, wherein the reception device is configured to notify the transmission device of terminal capacity of its own reception device.

5. The communication system according to claim 1, wherein the reception device is configured to notify the transmission device of a terminal capacity change in case that terminal capacity of its own reception device is changed, and
the transmission device is configured to change unicast signal transmission and multicast signal transmission in case that the terminal capacity change is notified from the reception device.

6. The communication system according to claim 5, wherein the transmission device is configured to notify the reception device of the change of the unicast signal transmission and of the multicast signal transmission.

7. The communication system according to claim 6, wherein the transmission device is configured to notify the reception device of change permission information for permitting the change and timing information indicating a change timing in case that the reception device is notified of the change of the unicast signal transmission and of the multicast signal transmission.

8. The communication system according to claim 1, wherein the first and second control units are configured to determine at least one of the first and second signal reception units to be used, the determination being made based on information regarding whether the first and second signal reception units only receive the unicast signal or receive the unicast signal and the multicast signal.

9. A reception device configured to communicate with at least one transmission device, the reception device comprising:
first and second signal reception units configured to receive at least one unicast signal and multicast signal from the transmission device and to perform a reception process including demodulation and down-conversion;
a first control unit configured to receive the unicast signal from the transmission device using the reception processes of both of the first and second signal reception units in case that only the unicast signal is received; and
a second control unit configured to receive the unicast signal from the transmission device using the reception process of the first signal reception unit and without using the reception process of the second reception unit, and simultaneously receive the multicast signal from the transmission device using the reception process of the second reception unit and without using the reception process of the first reception unit, in case that the unicast signal and the multicast signal are received.

10. The reception device according to claim 9, wherein the first and second control units are configured to determine at least one of the first and second signal reception units to be used, the determination being made based on information regarding whether the first and second signal reception units only receive the unicast signal or receive the unicast signal and the multicast signal.

11. A communication method using at least one transmission device and a reception device having first and second signal reception units which receive at least one unicast signal and multicast signal from the transmission device and perform a reception process including demodulation and down-conversion, the communication method comprising:
   transmitting, by the transmission device, at least one the unicast signal and the multicast signal to the reception device;
   receiving, by the reception device, the unicast signal from the transmission device using the reception processes of both first and second signal reception units in case that only the unicast signal is received; and
   receiving, by the reception device, the unicast signal from the transmission device using the reception process of the first signal reception unit and without using the reception process of the second reception unit, and simultaneously receiving the multicast signal from the transmission device using the reception process of the second reception unit and without using the reception process of the first reception unit, in case that the unicast signal and the multicast signal are received.

12. The communication method according to claim 11, further comprising:
   determining, by the reception device, at least one of the first and second signal reception units to be used, the determination being made based on information regarding whether the first and second signal reception units only receive the unicast signal or receive the unicast signal and the multicast signal.

* * * * *